US012248312B2

(12) United States Patent
Zhang et al.

(10) Patent No.: US 12,248,312 B2
(45) Date of Patent: Mar. 11, 2025

(54) UNMANNED AERIAL VEHICLE-COMBINED AUTONOMOUS MOBILE ROBOT CHECKING SYSTEM

(71) Applicant: LINGDONG TECHNOLOGY (BEIJING) CO. LTD., Beijing (CN)

(72) Inventors: Guangpeng Zhang, Beijing (CN); Liang Sui, Beijing (CN); Yaming Tang, Beijing (CN)

(73) Assignee: LINGDONG TECHNOLOGY (BEIJING) CO. LTD., Beijing (CN)

( * ) Notice: Subject to any disclaimer, the term of this patent is extended or adjusted under 35 U.S.C. 154(b) by 383 days.

(21) Appl. No.: 17/625,676

(22) PCT Filed: Jul. 1, 2020

(86) PCT No.: PCT/CN2020/099754
§ 371 (c)(1),
(2) Date: Jan. 7, 2022

(87) PCT Pub. No.: WO2021/008371
PCT Pub. Date: Jan. 21, 2021

(65) Prior Publication Data
US 2022/0244721 A1    Aug. 4, 2022

(30) Foreign Application Priority Data
Jul. 12, 2019  (CN) .......................... 201910628929.1

(51) Int. Cl.
*G05D 1/00*    (2024.01)
*B64F 3/02*    (2006.01)
(Continued)

(52) U.S. Cl.
CPC .............. *G05D 1/0011* (2013.01); *B64F 3/02* (2013.01); *B64U 10/60* (2023.01); *B64U 50/34* (2023.01);
(Continued)

(58) Field of Classification Search
CPC .... G05D 1/0011; G05D 1/101; G05D 1/0866; G05D 1/0094; G05D 1/0257;
(Continued)

(56) References Cited

U.S. PATENT DOCUMENTS 10,007,890 B1 *  6/2018  Purwin ................ G08G 5/0069
10,336,543 B1 *  7/2019  Sills ..................... G05D 1/0027
(Continued)

FOREIGN PATENT DOCUMENTS

| CN | 105517664 A | 4/2016 |
| CN | 106528592 A | 3/2017 |

(Continued)

OTHER PUBLICATIONS

The Office Action of the corresponding JP Patent Application No. 2021-576530 issued on Feb. 7, 2023 along with English translation thereof.

(Continued)

*Primary Examiner* — Anne Marie Antonucci
*Assistant Examiner* — Jewel Ashley Kuntz
(74) *Attorney, Agent, or Firm* — NZ Carr Law Office

(57) ABSTRACT

An autonomous mobile robot checking system comprises a transmission line, an unmanned aerial vehicle and an autonomous mobile device. The unmanned aerial vehicle is used for sensing stacked goods to generate sensing information. The autonomous mobile device is used for receiving the sensing information through the transmission line, and supplying power to the unmanned aerial vehicle through the transmission line to enable the unmanned aerial vehicle to sense the stacked goods. The autonomous mobile device provides a checking result for the stacked goods based on the sensing information.

20 Claims, 17 Drawing Sheets

(51) Int. Cl.
| | |
|---|---|
| *B64U 10/60* | (2023.01) |
| *B64U 50/34* | (2023.01) |
| *B64U 70/97* | (2023.01) |
| *B64U 80/86* | (2023.01) |
| *G06Q 10/087* | (2023.01) |
| *B64U 10/14* | (2023.01) |
| *B64U 30/26* | (2023.01) |
| *B64U 101/70* | (2023.01) |

(52) U.S. Cl.
CPC ............ *B64U 70/97* (2023.01); *B64U 80/86* (2023.01); *G05D 1/101* (2013.01); *G06Q 10/087* (2013.01); *B64U 10/14* (2023.01); *B64U 30/26* (2023.01); *B64U 2101/70* (2023.01); *B64U 2201/202* (2023.01)

(58) Field of Classification Search
CPC .. G05D 1/0231; B64C 39/022; B64C 39/024; B64F 3/02; G06Q 10/087; G06Q 10/083; G06Q 10/08; B64U 10/13; B64U 80/86; B64U 2101/00; B64U 10/60; B64U 2101/70; B64U 50/34; B64U 70/97; B64U 10/14; B64U 30/26; B64U 2201/202
See application file for complete search history.

(56) References Cited

U.S. PATENT DOCUMENTS

| | | | |
|---|---|---|---|
| 2012/0303179 A1 | 11/2012 | Schempf | |
| 2018/0005173 A1 | 1/2018 | Elazary et al. | |
| 2018/0251234 A1* | 9/2018 | Wang | G01C 21/3691 |
| 2019/0026531 A1 | 1/2019 | Alvarez Gonzalez et al. | |
| 2020/0257295 A1* | 8/2020 | Park | G05D 1/102 |
| 2021/0216948 A1* | 7/2021 | Foina | G08G 5/0013 |

FOREIGN PATENT DOCUMENTS

| | | |
|---|---|---|
| CN | 106986170 A | 7/2017 |
| CN | 110378650 A | 10/2019 |
| JP | 2010-23950 | 2/2010 |
| WO | 2015/180180 | 12/2015 |
| WO | 2018057629 A1 | 3/2018 |
| WO | 2019124894 A1 | 6/2019 |

OTHER PUBLICATIONS

The Second Office Action of the corresponding CN Patent Application No. 201910628929.1 issued on Dec. 4, 2020 along with English translation thereof.

The Refutation Decision of the corresponding CN Patent Application No. 201910628929.1 searched on Feb. 20, 2021 along with English translation thereof.

Extended European Search Report (EESR) of the corresponding EP Patent Application No. 20855804.9 dated Oct. 19, 2022.

The office action of the corresponding CN Patent Application No. 201910628929.1 (with English Summary) searched on Aug. 18, 2020.

The search report of the corresponding CN Patent Application No. 201910628929.1 (with English Summary) searched on Aug. 10, 2020.

The international search report of the corresponding PCT Application No. PCT/CN2020/099754 dated Sep. 3, 2020.

EESR of the corresponding EP Patent Application No. 20839772.9 dated Jul. 7, 2023.

Zikou Lida et al: "Inspection Operations Using an Aerial Robot Powered-over-Tether by a Ground Vehicle", Dec. 18, 2015 (Dec. 18, 2015), SAT 2015 18th International Conference, Austin, TX, USA, Sep. 24-27, 2015; [Lecture Notes in Computer Science; Lect. Notes Computer], Springer, Berlin, Heidelberg, pp. 455-465, XP047332061.

The Notification of Reexamination of the corresponding CN Patent Application No. 201910628929.1 issued on Nov. 24, 2023 along with English translation thereof.

The Reexamination Decision of the corresponding CN Patent Application No. 201910628929.1 issued on Mar. 1, 2024 along with English translation thereof.

\* cited by examiner

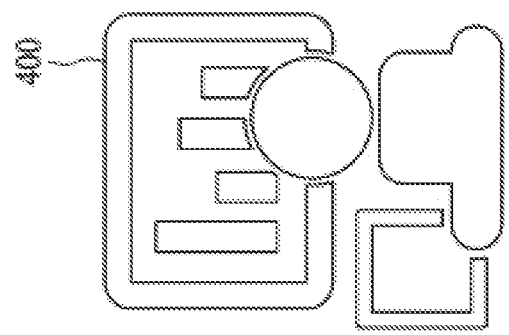
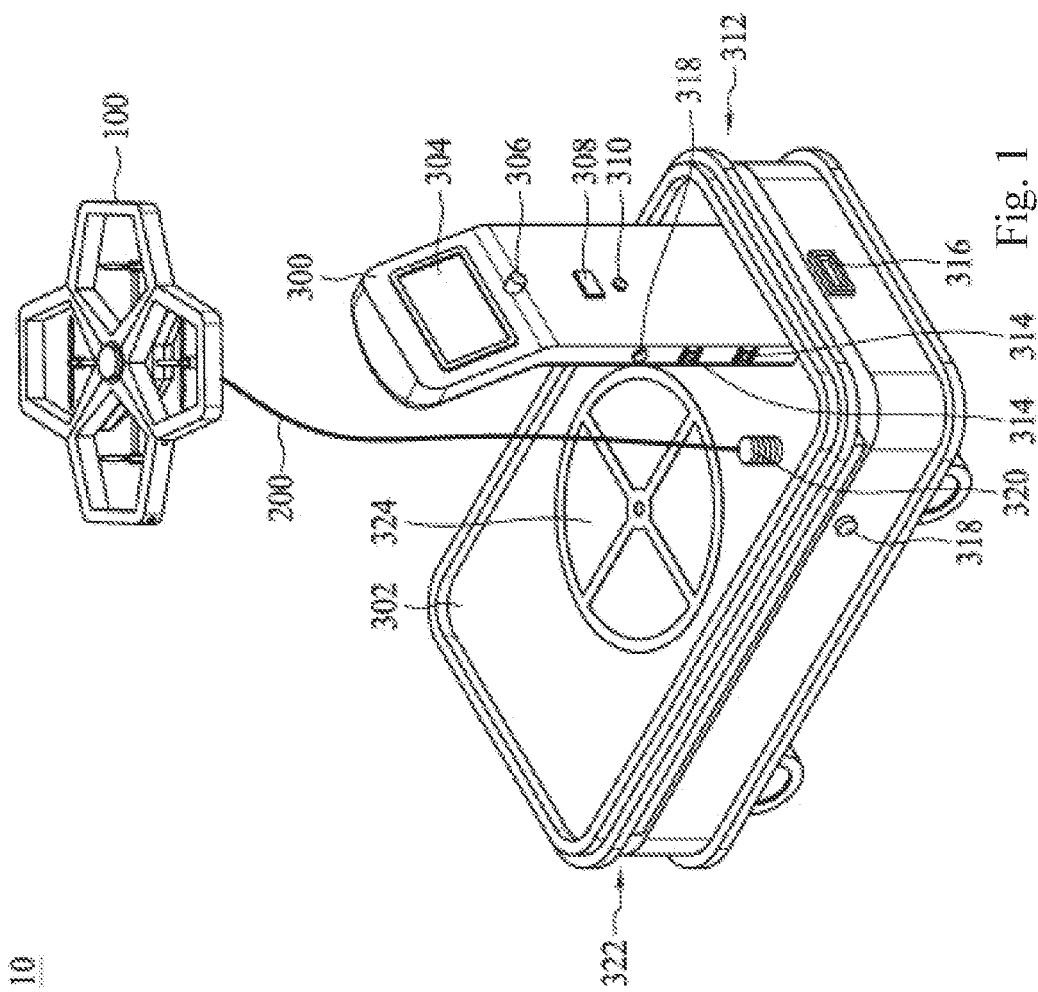
Fig. 1

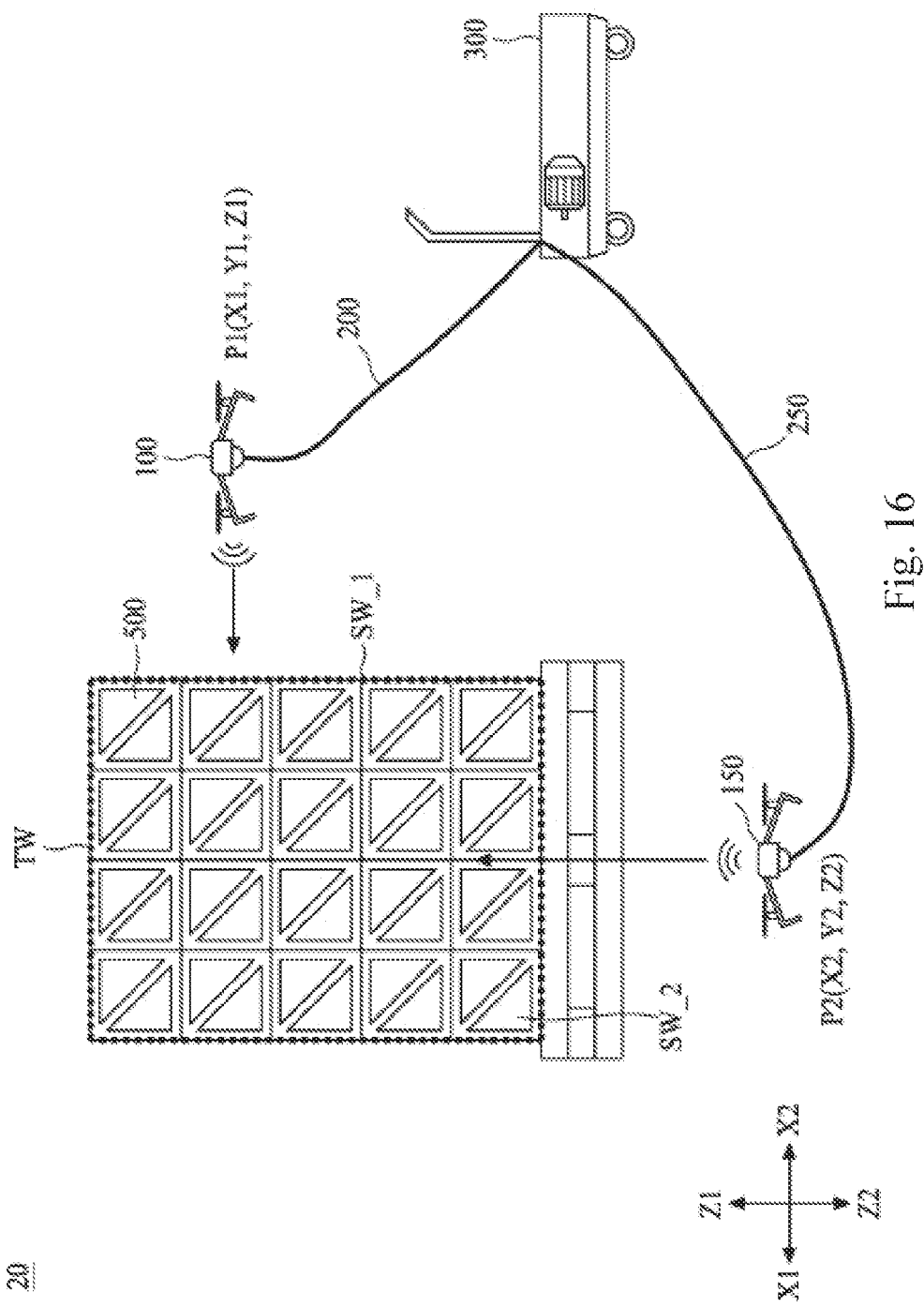

UNMANNED AERIAL VEHICLE-COMBINED AUTONOMOUS MOBILE ROBOT CHECKING SYSTEM

TECHNICAL FIELD

The application relates to an autonomous mobile robot checking system, in particular to an unmanned aerial vehicle-combined autonomous mobile robot checking system.

BACKGROUND

Warehouse inventory was mostly checked by manpower in the past, which is time and labour consuming. In view of this problem, intelligent checking devices have been made in recent years, but the existing devices have limited functions and are very expensive. More recently, checking with an autonomous mobile robot (AMR) and an unmanned aerial vehicle (UAV) has been adopted to realize low-cost checking. However, there are still many problems in the interaction between the AMR and the UAV. In order to realize low-cost checking, how to improve the interaction between the two has become an important issue.

SUMMARY

The application aims to provide an autonomous mobile robot checking system, and particularly relates to an unmanned aerial vehicle-combined autonomous mobile robot checking system to solve the problems in the prior art.

According to an embodiment of the application, an autonomous mobile robot checking system is disclosed. The autonomous mobile robot checking system comprises a transmission line, an unmanned aerial vehicle and an autonomous mobile device. The unmanned aerial vehicle is used for sensing stacked goods to generate sensing information. The autonomous mobile device is used for receiving the sensing information through the transmission line, and supplying power to the unmanned aerial vehicle through the transmission line to enable the unmanned aerial vehicle to sense the stacked goods. The autonomous mobile device provides a checking result for the stacked goods based on the sensing information.

In some embodiments of the application, the transmission line mechanically and electrically connects the unmanned aerial vehicle to the autonomous mobile device.

In some embodiments of the application, the autonomous mobile device automatically enters a checking mode in response to the mechanical and electrical connection. The unmanned aerial vehicle senses the stacked goods in the checking mode.

In some embodiments of the application, the autonomous mobile device enters the checking mode in response to user's input. The unmanned aerial vehicle senses the stacked goods in the checking mode.

In some embodiments of the application, the autonomous mobile device comprises a cable receiving unit. The cable receiving unit is used for receiving the transmission line.

In some embodiments of the application, the cable receiving unit is used for selectively taking up or setting out the transmission line along with movement of the unmanned aerial vehicle relative to the stacked goods.

In some embodiments of the application, the stacked goods together define a side face and a top face. The unmanned aerial vehicle faces the side face of the stacked goods in a front-back direction, and is separated from the autonomous mobile device in an up-down direction. The unmanned aerial vehicle comprises a sensing module. The sensing module is used for sensing the side face of the stacked goods in the front-back direction to obtain the sensing information.

In some embodiments of the application, the stacked goods together define a side face and a top face. The unmanned aerial vehicle is located above the top face of the stacked goods in an up-down direction, and is separated from the autonomous mobile device in the up-down direction. The unmanned aerial vehicle comprises a sensing module. The sensing module is used for sensing the top face of the stacked goods in the up-down direction to obtain the sensing information.

In some embodiments of the application, the autonomous mobile device comprises a housing and a cover. The housing defines a receiving space therein. The receiving space is used for receiving the unmanned aerial vehicle. The cover is arranged above the receiving space and covers the receiving space.

In some embodiments of the application, the stacked goods together define a first face and a second face. After the autonomous mobile device finishes sensing the first face of the stacked goods, the autonomous mobile device, through the transmission line, makes the unmanned aerial vehicle sense the second face of the stacked goods, when the checking result is not consistent with a predetermined result for the stacked goods.

In some embodiments of the application, when the checking result is not consistent with the predetermined result for the stacked goods, the autonomous mobile device makes the unmanned aerial vehicle sense the second face of the stacked goods in response to the user's input.

In some embodiments of the application, the unmanned aerial vehicle is a first unmanned aerial vehicle. The sensing information is first sensing information. The transmission line is a first transmission line. The stacked goods together define a first face and a second face. The first unmanned aerial vehicle is used for sensing the first face of the stacked goods to generate the first sensing information. The system further comprises a second transmission line and a second unmanned aerial vehicle. The second unmanned aerial vehicle is used for sensing the second face of the stacked goods to generate second sensing information. The autonomous mobile device receives the second sensing information through the second transmission line, and supplies power to the second unmanned aerial vehicle through the second transmission line to enable the second unmanned aerial vehicle to sense the second face of the stacked goods. The autonomous mobile device further provides the checking result for the stacked goods based on the first sensing information and the second sensing information.

In some embodiments of the application, the first face and the second face of the stacked goods are a first side face and the second side face of the stacked goods respectively.

In some embodiments of the application, the first face and the second face of the stacked goods are adjacent to each other.

In some embodiments of the application, the first face and the second face of the stacked goods are a side face and a top face of the stacked goods respectively.

In some embodiments of the application, the autonomous mobile device is further used for assigning a sensing position of the first face of the stacked goods to the first unmanned aerial vehicle through the first transmission line, and assigning a sensing position of the second face of the stacked goods to the second unmanned aerial vehicle through the second transmission line.

According to an embodiment of the application, an autonomous mobile robot checking system is disclosed. The autonomous mobile robot checking system comprises a transmission line, an unmanned aerial vehicle and an autonomous mobile device. The unmanned aerial vehicle is used for sensing stacked goods to generate sensing information. The autonomous mobile device is used for controlling the unmanned aerial vehicle to move to a sensing position through the transmission line to sense the stacked goods, receiving the sensing information through the transmission line, and providing a checking result for the stacked goods based on the sensing information.

In some embodiments of the application, the autonomous mobile device determines the sensing position based on a length of the transmission line.

In some embodiments of the application, the sensing position is a first sensing position. After the unmanned aerial vehicle finishes sensing the stacked goods at the first sensing position, the autonomous mobile device controls, through the transmission line, the unmanned aerial vehicle to move to a second sensing position to sense the stacked goods, when the checking result is not consistent with a predetermined result for the stacked goods.

In some embodiments of the application, the stacked goods together define a first face and a second face. The unmanned aerial vehicle faces the first face at the first sensing position and faces the second face at the first sensing position.

In some embodiments of the application, the first face is a first side face defined by the stacked goods together, and the second face is a second side face defined by the stacked goods together.

In some embodiments of the application, the first face is a side face defined by the stacked goods together, and the second face is a top face defined by the stacked goods together.

The system disclosed in the application comprises the transmission line. Since the autonomous mobile device supplies power to the unmanned aerial vehicle through the transmission line, the unmanned aerial vehicle does not need to return to charge frequently, which makes the checking more efficient. In addition, the unmanned aerial vehicle is not responsible for calculation related to checking, but sends the sensing information back to the autonomous mobile device. The autonomous mobile device with strong computing ability makes the calculation more efficient. In addition, the sensing information is sent back to the autonomous mobile device in a wired way, so data transmission is less subjected to bandwidth limitation, which makes data transmission more efficient.

BRIEF DESCRIPTION OF THE DRAWINGS

FIG. 1 is a diagram of a system according to an embodiment of the application.

FIG. 16 is a diagram of another system working in a checking mode according to the embodiment of the application.

Figure 2B:
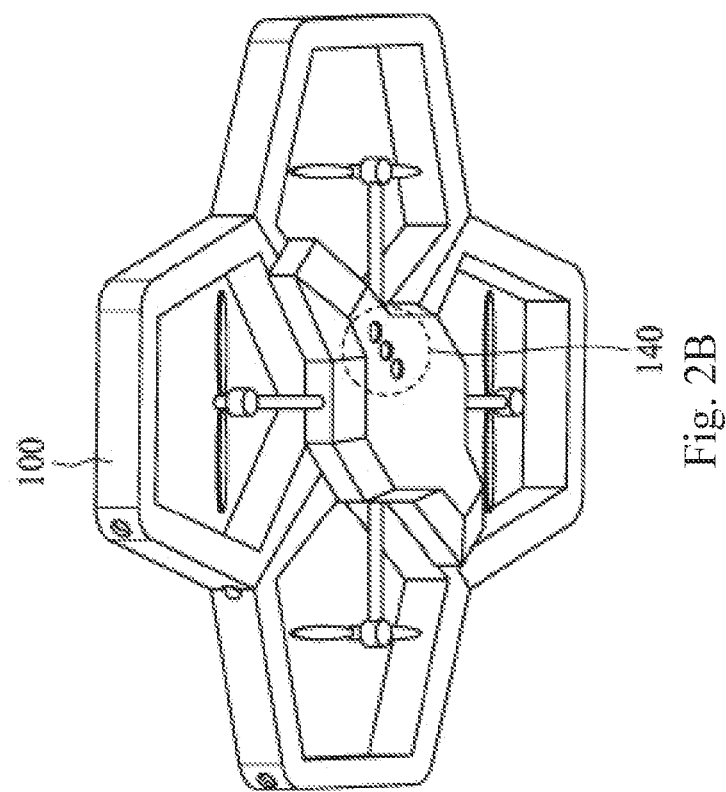
FIG. 2B is a stereogram of the unmanned aerial vehicle of FIG. 2A from another perspective.

DESCRIPTION OF REFERENCE NUMERALS 10, system; 20, system; 100, unmanned aerial vehicle; 110, wired data transmission module; 120, battery; 130, sensing module; 132, distance sensor; 134, camera; 140, sensing module; 142, distance sensor; 144, camera; 150, unmanned aerial vehicle; 200, transmission line; 250, transmission line; 300, autonomous mobile device; 302, vehicle body; 304, interactive screen; 306, interactive button; 308, front distance sensor; 310, camera; 312, laser radar; 314, side sensor; 316, front distance sensor; 318, emergency stop button; 320, cable receiving unit; 321, motor; 322, laser radar; 324, identification mark for landing; 326, wireless data transmission module; 328, wired data transmission module; 330, Central Processing Unit (CPU); 332, Graphics Processing Unit (GPU); 334, power supply module; 336, storage device; 338, positioning information; 340, navigation information; 342, control information; 344, loading information; 346, picking information; 348, checking information; 349, housing; 350, cover; 352, receiving space; 400, remote terminal; 410, 412, 414, 416, interactive block; 500, goods; I_S, sensing information; ST, checking result; Z1-Z2, height direction; X1-X2, front-back direction; SW_1, side face; SW_2, side face; TW, top face; P1, first sensing position; P2, second sensing position; (X1, Y1, Z1), coordinates; (X2, Y2, Z2), coordinates

DETAILED DESCRIPTION OF EMBODIMENTS

The following disclosure provides various embodiments or examples that may be used to realize different features of the disclosure. The specific examples of components and configurations described below are used to simplify the present disclosure. It is conceivable that these descriptions are only examples and are not intended to limit the present disclosure. For example, in the following description, forming a first feature on or over a second feature may include some embodiments in which the first and second features are in direct contact with each other; and may also include some embodiments in which additional components are formed between the above-mentioned first and second features, so that the first and second features may not be in direct contact. In addition, the present disclosure may repeatedly use component symbols and/or labels in several embodiments. This repeated use is based on the purpose of conciseness and clarity, and does not itself represent the relationship between different embodiments and/or configurations discussed.

Further, the use of spatially relative words, such as "below", "under", "lower", "above", "over" and the like, may be for the convenience of explaining the relationship between one component or feature depicted in the figure with respect to another one or more components or features. These spatially relative words are intended to cover different orientations of a device in use or operation, in addition to the orientations shown in the figure. It is possible to place the device in other orientations (such as rotating 90 degrees or in other orientations), and these spatially relative descriptive words should be explained accordingly.

Although the numerical ranges and parameters used to define the broad scope of the application are approximate numerical values, the relevant numerical values in specific embodiments have been presented here as accurately as possible. However, any numerical value inevitably contains the standard deviation caused by individual test methods. Here, "about" usually means that the actual value is 10%, 5%, 1% or 0.5% higher or lower than a specific value or range. Or, the word "about" means that the actual value falls within the acceptable standard error of the average value, depending on the consideration of those who have ordinary knowledge in the technical field to which the application belongs. It may be understood that all ranges, quantities, values and percentages used here (for example, to describe material consumption, time, temperature, operating conditions, quantity ratio and the like) have been modified by "about" except for the experimental examples, or unless otherwise explicitly stated. Therefore, unless otherwise stated to the contrary, the numerical parameters disclosed in this specification and the scope of the appended patent application are approximate numerical values, which may be changed as required. At least these numerical parameters should be understood as the indicated number of significant digits and the numerical values obtained by applying the general carry method. Here, the numerical range is expressed as from one endpoint to another endpoint or between two endpoints. Unless otherwise stated, the numerical ranges mentioned herein all include endpoints.

When an unmanned aerial vehicle is sensing stacked goods, an autonomous mobile robot cannot supply power to the unmanned aerial vehicle, which causes the unmanned aerial vehicle to frequently return to the autonomous mobile robot to be charged. In addition, the unmanned aerial vehicle with relatively weak computing ability being responsible for calculation related to checking will lead to low calculation efficiency. Further, the unmanned aerial vehicle and the autonomous mobile robot communicate through wireless signals, so the communication between them will be limited by the bandwidth of the wireless signals. The system disclosed in the application is less limited by power, bandwidth and computing power, which will be detailed below.

FIG. 1 is a diagram of a system 10 according to an embodiment of the application. Referring to FIG. 1, the system 10 comprises an unmanned aircraft 100, a transmission line 200, an autonomous mobile device 300, and a remote terminal 400.

Figure 4:
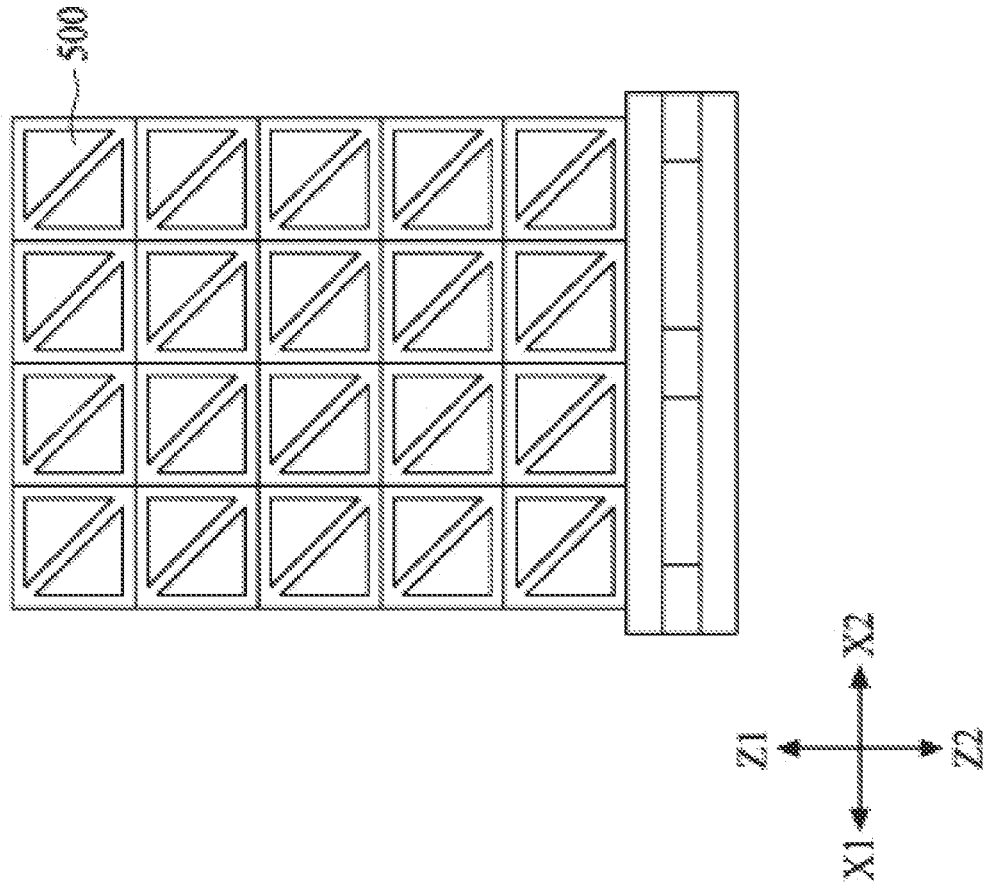
FIG. 4 is a diagram of an autonomous mobile device shown in FIG. 1 working in a loaded mode.
Figure 8:
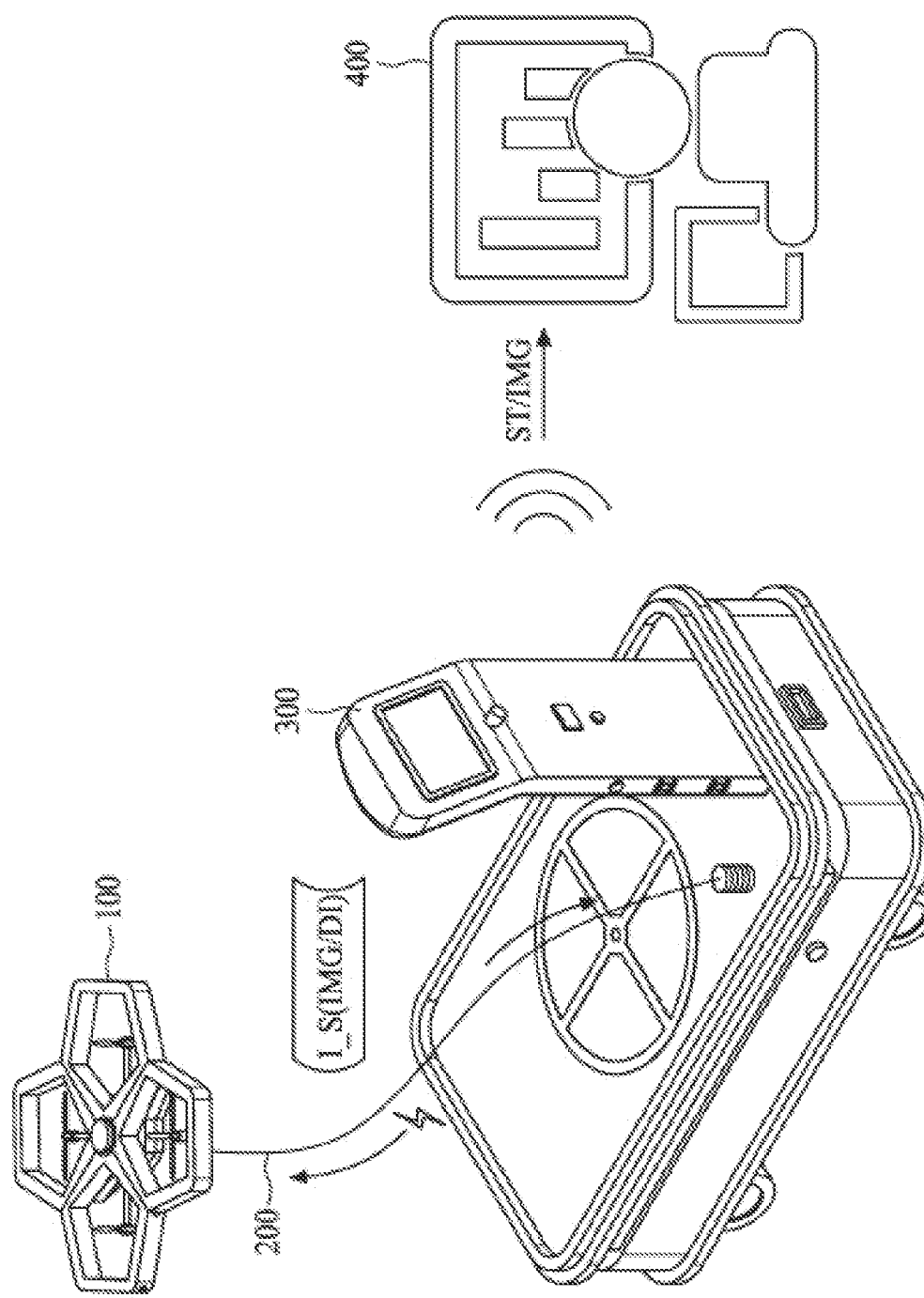
FIG. 8 is a diagram of the autonomous mobile device shown in FIG. 1 working in a checking mode.

The unmanned aerial vehicle 100 is used for sensing an object to be detected to generate sensing information I_S (as shown in FIG. 8). In this disclosure, the object to be detected refers to stacked goods 500 (as shown in FIG. 4), which will be detailed below. It should be noted that the balance and obstacle avoidance of the unmanned aerial vehicle 100 in the moving process are controlled by the unmanned aerial vehicle 100 itself. However, a destination to which the unmanned aerial vehicle 100 goes, or a direction in which the unmanned aerial vehicle 100 moves, is controlled by the autonomous mobile device 300. Specifically, the forward and backward movement and flying height of the unmanned aerial vehicle 100, or which side of the object to be detected it faces, is controlled by the autonomous mobile device 300. In addition, the stacked goods 500 may be stacked on pallets or shelves.

The transmission line 200 is used for the transmission of both power and information. In some embodiments, the transmission line 200 comprises a power line, an ultra-fine coaxial line, or a flexible printed circuit board (FPCB) line. In some embodiments, the transmission lines 200 are transmission lines made of the same material or different materials, such as single-core lines or other types of signal lines and combinations of various signal lines. In other embodiments, high frequency carrying information is loaded on a current and then transmitted through a power line, an adapter receiving the information is used to separate the high frequency from the current and transmit the high frequency. Generally speaking, compared with wireless transmission, the bandwidth of the transmission band of the transmission line 200 for wired transmission is better.

The autonomous mobile device 300 may operate in a loaded mode or a checking mode. The operation of the autonomous mobile device 300 in the loaded mode will be described in FIG. 4, and the operation in the checking mode will be described in FIGS. 6 to 9. The loaded mode and the checking mode each have two working states, one is an execution state, and the other is a standby state.

The operation of the autonomous mobile device 300 in the checking mode will be briefly described below. In the checking mode, when the autonomous mobile device 300 conducts checking (that is, the autonomous mobile device 300 is performing tasks), the autonomous mobile device 300 controls the unmanned aerial vehicle 100 through the transmission line 200, so that the unmanned aerial vehicle 100 senses the object to be detected. When the unmanned aerial vehicle 100 senses the object to be detected, the autonomous mobile device 300 supplies power to the unmanned aerial vehicle 100 through the transmission line 200, so the unmanned aerial vehicle 100 does not need to return to the autonomous mobile device 300 frequently to charge, and the checking is more efficient. In addition, the autonomous mobile device 300 communicates with the unmanned aerial vehicle 100 through the transmission line 200 to exchange information, wherein the information may include control signals provided by the autonomous mobile device 30) or sensing information I_S generated by the unmanned aerial vehicle 100. Thanks to the wired transmission, the communication between the autonomous mobile device 300 and the unmanned aerial vehicle 100 is less subjected to bandwidth limitation. Therefore, data transmission is more efficient.

After the autonomous mobile device 300 receives the sensing information I_S provided by the unmanned aerial vehicle 100, the autonomous mobile device 300 with strong computing ability computes the sensing information I_S. Therefore, calculation is more efficient, and the details are as follows. The autonomous mobile device 300 also transmits the sensing information I_S, a calculation result and its location back to the remote terminal 400. In some embodiments, the autonomous mobile device 300 comprises an autonomous mobile robot.

The remote terminal 400 is used for receiving the sensing information I_S, the calculation result and the location of the autonomous mobile device 300 from the autonomous mobile device 300. In addition, the remote terminal 400 may also be used for switching the working modes of the autonomous mobile device 300, for example, between the loaded mode and the checking mode. In addition, the location of the autonomous mobile device 300 may also be output by the remote terminal 400, and the details will be described in the embodiment of FIG. 10. In some embodiments, the remote terminal 400 includes a remote control terminal, a remote display terminal or a remote server.

The autonomous mobile device 300 comprises a vehicle body 302, an interactive screen 304, an interactive button 306, a front distance sensor 308, a camera 310, a laser radar 312, a lateral sensor 314, a front distance sensor 316, an emergency stop button 318, a cable receiving unit 320, a laser radar 322, and an identification mark for landing 324.

The vehicle body 302 is used for carrying goods 500. For example, the goods 500 are placed on a top face of the vehicle body 302. In some embodiments, the vehicle body 302 is made of stainless steel pipes, so as to reduce the weight of the vehicle body 302.

The interactive screen 304 provides input and display functions. For example, destination address information of the autonomous mobile device 300 may be input on the interactive screen 304, and a digital map and a navigation route of the autonomous mobile device 300 may be displayed on the interactive screen 304. Alternatively, an operator may terminate the sensing of the unmanned aerial vehicle 100 through the interactive screen 304 and make the unmanned aerial vehicle 100 return to the autonomous mobile device 300, and the details are as follows. In some embodiments, the interactive screen 304 may specifically be a capacitive multi-touch screen, which improves the degree of intelligence, thus facilitating operation. In some embodiments, the interactive screen 304 may be used with the interactive button 306 to facilitate operation.

The front distance sensors 308 and 316 are arranged on the front side of the autonomous mobile device 300, and used for sensing a distance between an obstacle in front of the autonomous mobile device 300 and the autonomous mobile device 300. In some embodiments, the front distance sensors 308 and 316 each comprise one or more of solid-state radar, ultrasonic sensor, RGBD color and depth sensing camera, infrared sensor, Hall switch sensor and photoelectric sensor, so as to improve sensing accuracy and safety performance.

The camera 310 is used for capturing images in front of the camera 310, such as panoramic images. In some embodiments, the camera 310 may comprise a general camera, a night camera, or an RGBD color and depth sensing camera.

The laser radars 312 and 322 are used for sensing distances between obstacles in front of them laser radars 312 and 322 and the autonomous mobile device 300. For example, the laser radars 312 and 322 emit laser beams in all directions. The autonomous mobile device 300 draws a three-dimensional model of the surrounding environment through reflected signals.

The lateral sensor 314 is arranged at a side edge of the autonomous mobile device 300, and used for sensing a distance between an obstacle at the side edge of the autonomous mobile device 300 and the autonomous mobile device 300. In some embodiments, the lateral sensor 314 comprises one or more of solid-state radar, ultrasonic sensor, RGBD color and depth sensing camera, infrared sensor, Hall switch sensor and photoelectric sensor, so as to improve sensing accuracy and safety performance. In some embodiments, the lateral sensor 314 comprises a camera.

The emergency stop button 318, when enabled, is used for stopping the movement of the autonomous mobile device 3M). For example, the emergency stop button 318 may be enabled by pressing or turning.

The cable receiving unit 320 is used for receiving the transmission line 200. Specifically, the cable receiving unit 320 may selectively take up or set out the transmission line 200.

The identification mark for landing 324 is used as an identification mark of a landing site of the unmanned aerial vehicle 100. In this embodiment, the identification mark for landing 324 is provided on the top face of the vehicle body 302. However, the present disclosure is not limited thereto. The identification mark for landing 324 may be arranged at any suitable position.

Figure 2A:
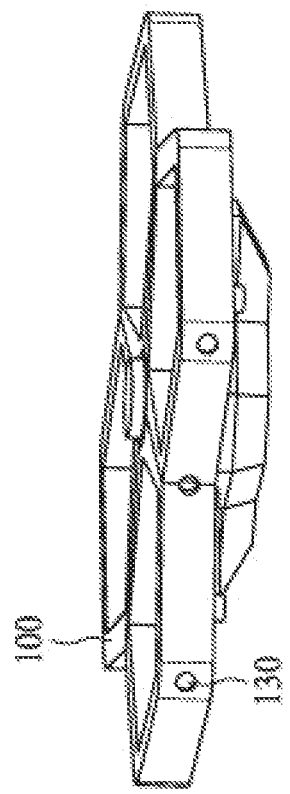
FIG. 2A is a stereogram of an unmanned aerial vehicle shown in FIG. 1.

FIG. 2A is a stereogram of the unmanned aerial vehicle 100 shown in FIG. 1. Referring to FIG. 2A, the unmanned aerial vehicle 100 comprises a sensing module 130. The sensing module 130 is arranged at a side edge of the unmanned aerial vehicle 100, and senses an object to be detected at the side edge of the unmanned aerial vehicle 100. In some embodiments, the object to be detected is stacked goods 500.

FIG. 2B is a stereogram of the unmanned aerial vehicle 100 of FIG. 2A from another perspective. Referring to FIG. 2B, the unmanned aerial vehicle 100 comprises a sensing module 140. The sensing module 140 is arranged on a bottom face of the unmanned aerial vehicle 100 and senses an object to be detected below the unmanned aerial vehicle 100. In some embodiments, the object to be detected is the vehicle body 302 of the autonomous mobile device 300. For example, the unmanned aerial vehicle 100 identifies the identification mark for landing 324 arranged on the vehicle body 302 through the sensing module 140, and lands on the vehicle body 302 accordingly. In some embodiments, the object to be detected is stacked goods 500.

Figure 3:
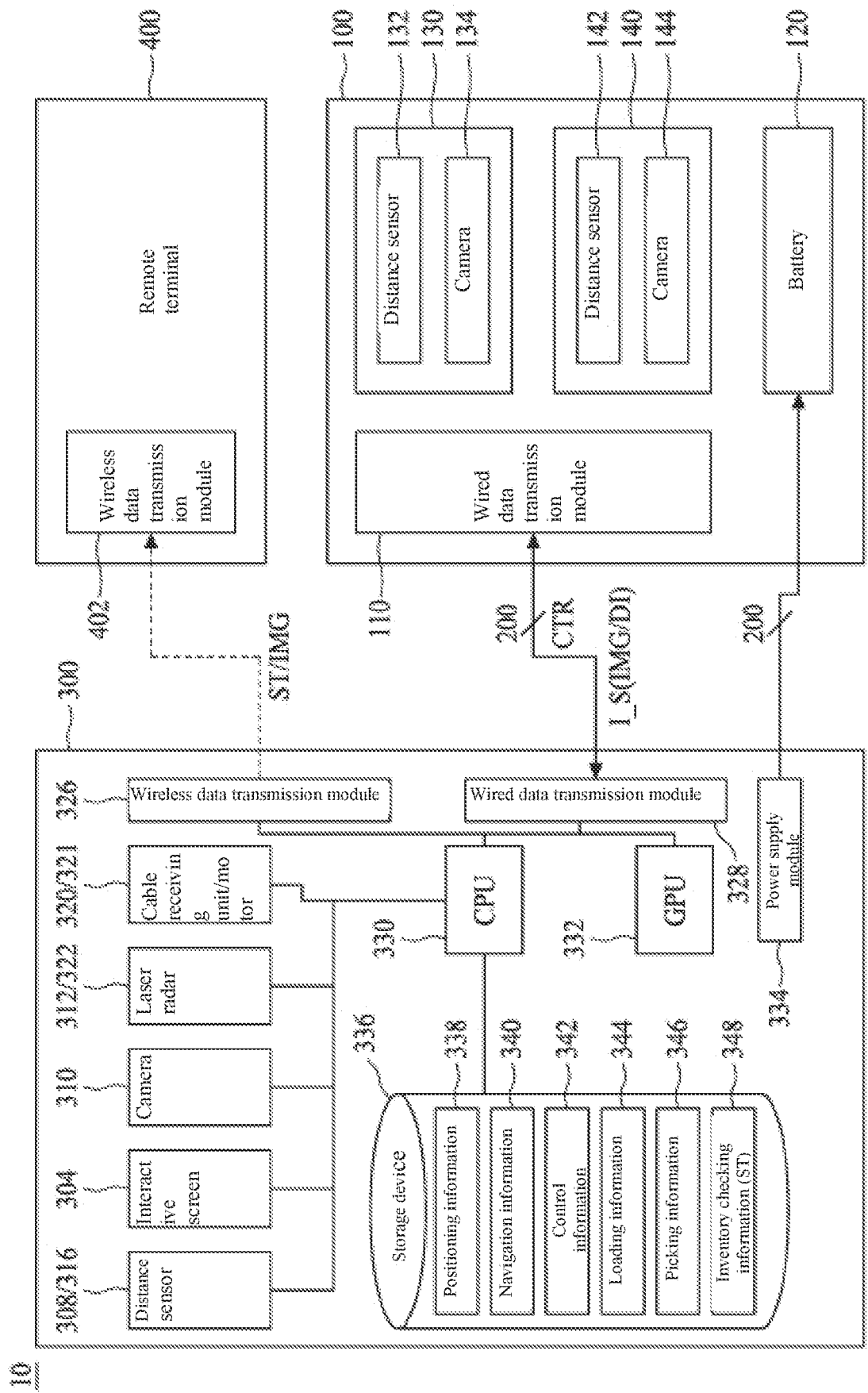
FIG. 3 is a block diagram of the system shown in FIG. 1.

FIG. 3 is a block diagram of the system 10 shown in FIG. 1. Referring to FIG. 3, in addition to the sensing modules 130 and 140, the unmanned aerial vehicle 100 comprises a wired data transmission module 110 and a battery 120. The unmanned aerial vehicle 100 performs wired transmission with devices outside the unmanned aerial vehicle 100 through the wired data transmission module 110. In some embodiments, the wired data transmission module 110 comprises an ethernet data transmission module, an RS232 data transmission module and an RS485 data transmission module.

The battery 120 of the unmanned aerial vehicle 100 is powered by the autonomous mobile device 300, and the battery 120 provides electric energy to enable the unmanned aerial vehicle 100 to sense the object to be detected. It should be noted that in some embodiments, when the power supply of the autonomous mobile device 300 is cut off, the battery 120 of the unmanned aerial vehicle 100 is not enough for the unmanned aerial vehicle 100 to sustain a complete checking process of the autonomous mobile device 300. For example, a complete checking process of the autonomous mobile device 300 takes one to two hours, but the electric energy provided by the battery 120 of the unmanned aerial vehicle 100 only allows the unmanned aerial vehicle 100 to work for twenty minutes.

The sensing module 130 of the unmanned aerial vehicle 100 comprises a distance sensor 132 and a camera 134. The distance sensor 132 is used for sensing a distance between the object to be detected and the unmanned aerial vehicle 100. In some embodiments, the distance sensor 132 comprises a depth camera, an ultrasonic sensor or an infrared distance sensor. The camera 134 is used for capturing an image of the object to be detected.

The sensing module 140 of the unmanned aerial vehicle 100 comprises a distance sensor 142 and a camera 144. The distance sensor 142 is used for sensing a distance between the object to be detected and the unmanned aerial vehicle 100. In some embodiments, the distance sensor 142 comprises a depth camera, an ultrasonic sensor or an infrared distance sensor. In some embodiments, the camera 144 is also used for capturing an image of the object to be detected, such as an image of the identification mark for landing 324.

In addition to the vehicle body 302, the interactive screen 304, the interactive button 306, the front distance sensor 308, the camera 310, the laser radar 312, the lateral sensor 314, the front distance sensor 316, the emergency stop button 318, the cable receiving unit 320, the laser radar 322 and the identification mark for landing 324, the autonomous mobile device 300 also comprises a motor 321, a wireless data transmission module 326, a wired data transmission module 328, a central processing unit (CPU) 330, a graphic processing unit (GPU) 332, a power supply module 334 and a storage device 336.

The motor 321 of the autonomous mobile device 300 is used for rotating the cable receiving unit 320 so that the cable receiving unit 320 selectively takes up or sets out the transmission line 200.

The autonomous mobile device 300 performs wireless transmission with devices outside the autonomous mobile device 300 through the wireless data transmission module 326. In some embodiments, the wireless data transmission module 326 adopts a micro-power wireless communication technology to realize long-distance transmission between receiving and transmitting modules. The wireless data transmission module 326 may comprise a digital phase-locked loop. In some embodiments, the frequency bands used by the wireless data transmission module 326 may be 433 MHz, 450 MHz, 470 MHz and 2.4 GHz.

The autonomous mobile device 300 and the unmanned aerial vehicle 100 perform wired transmission through the wired data transmission module 328 and the wired data transmission module 110. In some embodiments, the wired data transmission module 328 comprises a power line communication module, an ethernet data transmission module, an RS232 data transmission module and an RS485 data transmission module.

The CPU 330 and the GPU 332 of the autonomous mobile device 300 are used for computing the sensing information I_S. In addition, the CPU 330 of the autonomous mobile device 300 may also be used for controlling the forward and backward movement and flying height of the unmanned aerial vehicle 100, and which side of the object to be detected the unmanned aerial vehicle 100 faces. Further, the above components of the autonomous mobile device 300 may be controlled by the CPU 330.

The power supply module 334 of the autonomous mobile device 300 is used for supplying power to the unmanned aerial vehicle 100. Specifically, the power supply module 334 provides electric energy to the battery 120 of the unmanned aerial vehicle 100.

The storage device 336 of the autonomous mobile device 300 is used for storing positioning information 338 of the autonomous mobile device 300, navigation information 340 of the autonomous mobile device 300, control information 342 of the autonomous mobile device 300, loading information 344 of the autonomous mobile device 300, picking information 346 of the autonomous mobile device 300, and checking information 348 including a checking result ST. In some embodiments, the storage device 336 comprises a magnetic disk, an optical disk, a read-only memory (ROM) or a random access memory (RAM).

FIG. 4 is a diagram of the autonomous mobile device 300 shown in FIG. 1 working in the loaded mode. Referring to FIG. 4, in the loaded mode, when the autonomous mobile device 300 is performing a task, the autonomous mobile device 300, in the loaded mode, carries the goods 500 on the vehicle body 302, and may also transport the goods 500 to a designated place. When the autonomous mobile device 300 is on standby, the autonomous mobile device 300 stays in place, for example.

Figure 5:
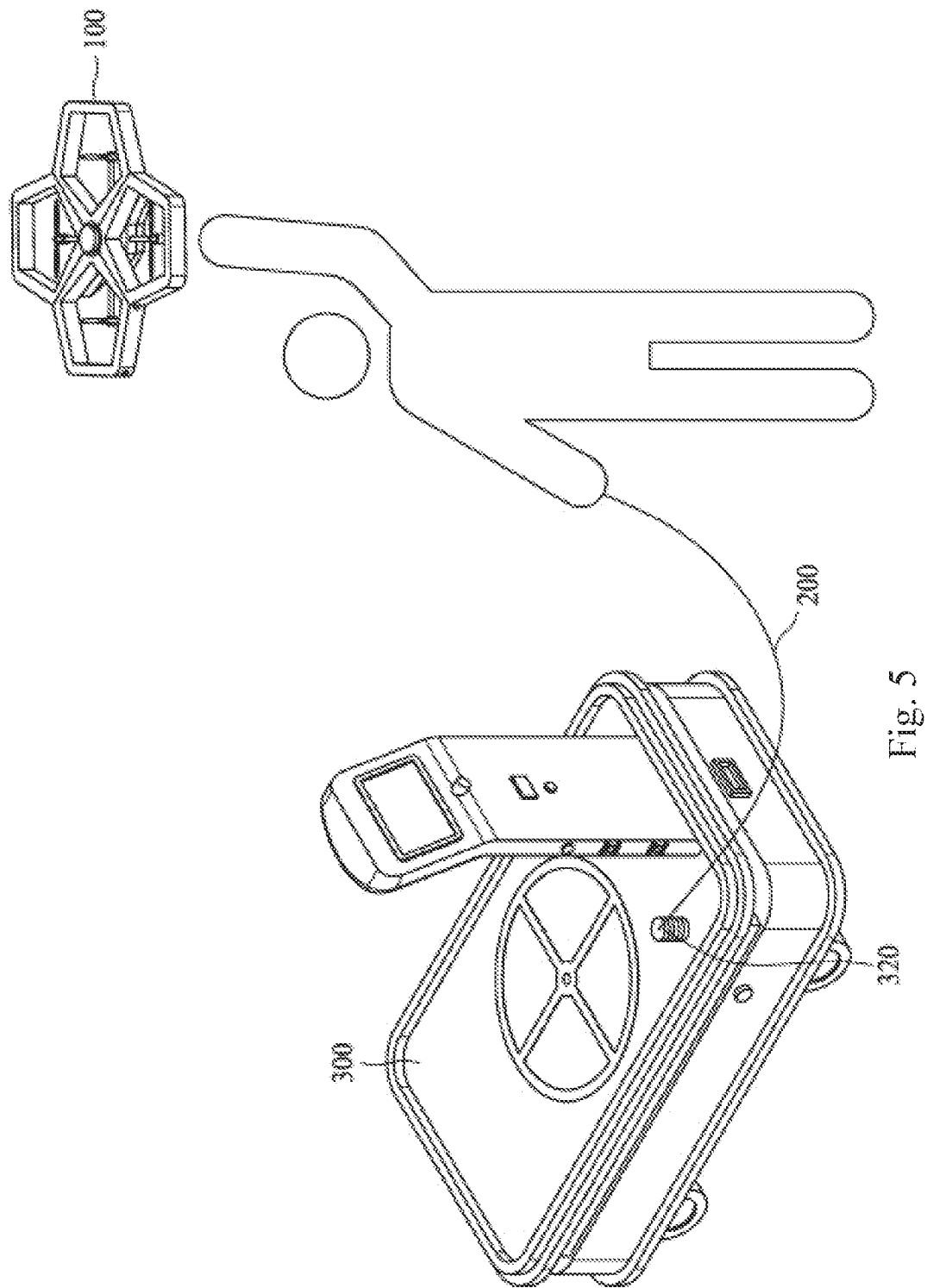
FIG. 5 is a diagram of the unmanned aerial vehicle shown in FIG. 1 being connected to the autonomous mobile device through a transmission line.

FIG. 5 is a diagram of the unmanned aerial vehicle 100 shown in FIG. 1 being connected to the autonomous mobile device 300 through the transmission line 200. Referring to FIG. 5, the operator mechanically and electrically connects one end of the transmission line 200 to the autonomous mobile device 300 through the cable receiving unit 320, and mechanically and electrically connects the other end of the transmission line 200 to the unmanned aerial vehicle 100. In some embodiments, the autonomous mobile device 300 automatically enters the checking mode in response to the mechanical and electrical connection of the transmission line 200, and in the checking mode, the unmanned aerial vehicle 100 will sense the stacked goods 500 when performing a task. However, the present disclosure is not limited thereto. In some embodiments, when the transmission line 200 is mechanically and electrically connected to the autonomous mobile device 300, the autonomous mobile device 300 may remain in the loaded mode until the operator inputs the user's input on the remote terminal 400, after which the autonomous mobile device 300 enters the checking mode in response to the user's input.

After entering the checking mode, the autonomous mobile device 300 may perform the task of checking. FIGS. 6 to 9 show that the autonomous mobile device 300 performs a complete checking task. It should be noted that FIGS. 6 to 9 only briefly illustrate the checking work, and any detailed and appropriate operation may be added to the checking work disclosed in this disclosure.

Figure 6:
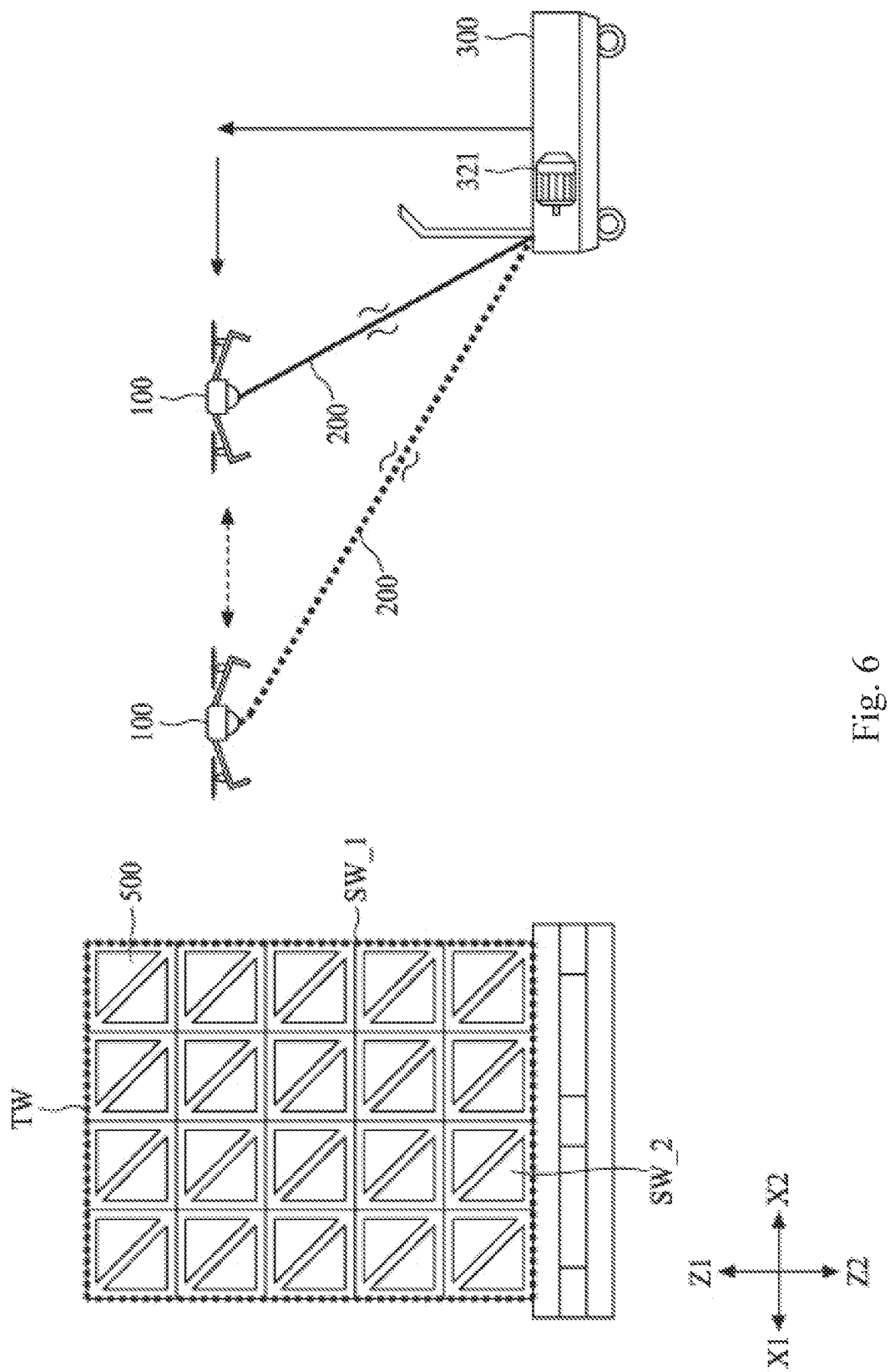
FIG. 6 is a diagram of the autonomous mobile device shown in FIG. 1 working in a checking mode in a take-up state and a set-out state respectively.
Figure 7:
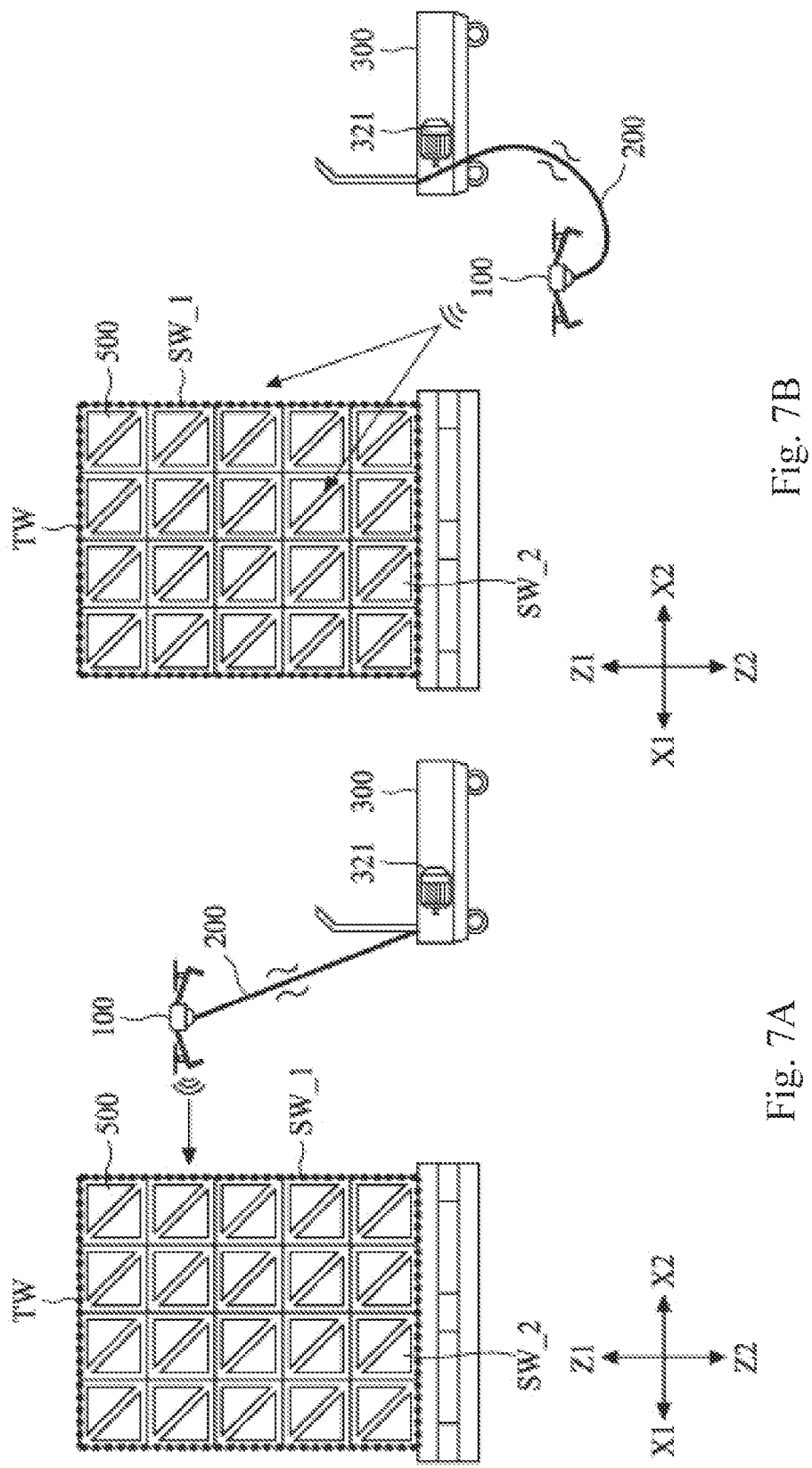
FIG. 7A shows an operation of the unmanned aerial vehicle shown in FIG. 1 of sensing a side face of stacked goods.
FIG. 7B is a diagram illustrating related operations derived from the operation of FIG. 7A.

FIG. 6 is a diagram of the autonomous mobile device 300 shown in FIG. 1 working in the checking mode in a take-up state and a set-out state respectively. Referring to FIG. 6, a plurality of pieces of goods 500 are stacked in a height direction Z1-Z2 and a front-back direction X1-X2. The stacked goods 500 together define a plurality of side faces, a top face and a bottom face opposite to the top face together. For simplicity, only the side faces SW_1 and SW_2 and the top face TW in the above-mentioned faces are labelled, wherein the side faces SW_1 and SW_2 are adjacent to each other. It should be noted that the side faces SW_1 and SW_2 and the top face TW may each be an uneven and discontinuous surface. For example, the plurality of pieces of goods 500 are not stacked neatly, and one piece of goods 500 may be convex or concave compared with another piece of goods 500; or, there is a significant gap between one piece of goods 500 and another piece of goods 500.

The autonomous mobile device 300 controls the unmanned aerial vehicle 100 to take off from the autonomous mobile device 300, and the unmanned aerial vehicle 100 is separated from the autonomous mobile device 300 in the height direction Z1-Z2. Then, the autonomous mobile device 300 controls the unmanned aerial vehicle 100 to move toward the stacked goods 500. The unmanned aerial vehicle 100 faces the side face SW_1 of the stacked goods 500 in the front-back direction X1-X2 and senses the stacked goods 500 to generate the sensing information I_S, which is described in detail in FIGS. 7A and 7B.

During the take-off and movement of the unmanned aerial vehicle 100, the motor 321 drives the cable receiving unit 320 to enable the cable receiving unit 320 to selectively take up or set out the transmission line 200 along with movement of the unmanned aerial vehicle 100 relative to the stacked goods 500.

FIG. 7A shows an operation of the unmanned aerial vehicle 100 shown in FIG. 1 of sensing a side face SW_1 of the stacked goods 500. Referring to FIG. 7A, the sensing module 130 senses the side face SW_1 of the stacked goods 500 in the front-back direction X1-X2. Specifically, the distance between the unmanned aerial vehicle 100 and the stacked goods 500 is sensed by the distance sensor 132 to generate distance data DI. After generating the distance data DI, the autonomous mobile device 300 controls the unmanned aerial vehicle 100 to perform the operation shown in FIG. 7B.

FIG. 7B is a diagram illustrating related operations derived from the operation of FIG. 7A. Referring to FIG. 7B, the camera 134 of the sensing module 130 captures images of the side face SW_1 and the side face SW_2 adjacent to the side face SW_1 to generate image data IMG. The sensing information I_S provided by the sensing module 130 includes the distance data DI and the image data IMG.

In some embodiments, the autonomous mobile device 300 may determine the side face SW_2 adjacent to the side face SW_1 based on the side face SW_1 sensed by the distance sensor 132, and control the unmanned aerial vehicle 100 to capture the image of the side face SW_2 in addition to the image of the side face SW_1 accordingly.

It should be noted that the sensing operation of the unmanned aerial vehicle 100 is not limited to the sequence shown in FIGS. 7A and 7B. In some embodiments, the unmanned aerial vehicle 100 may first perform the operation shown in FIG. 7B, and then perform the operation shown in FIG. 7A. For example, the images of the two faces are captured first, and then the distance between the unmanned aerial vehicle 100 and one of the two faces is sensed. Alternatively, the unmanned aerial vehicle may simultaneously obtain the distance data DI and the image data IMG with one operation. Alternatively, the unmanned aerial vehicle 100 may obtain suitable information through other suitable sensing devices.

FIG. 8 is a diagram of the autonomous mobile device 300 shown in FIG. 1 working in the checking mode. Referring to FIG. 8, the sensing information I_S is received by the autonomous mobile device 300 through the transmission line 200. The autonomous mobile device 300 may generate height information of the stacked goods 500 in the height directions Z1-Z2 and length information in a length direction based on the distance data DI in the sensing information I_S. The autonomous mobile device 300 may also generate width information of the stacked goods 500 in the front-back direction X1-X2 based on the image data IMG in the sensing information I_S. Then, the autonomous mobile device 300 computes the height information, length information and width information related to the side face SW_1 to provide the checking result ST of the stacked goods 500, and the checking result ST includes the amount of the stacked goods 500.

The autonomous mobile device 300 with strong computing ability computes the sensing information I_S, so calculation is more efficient. In addition, the sensing information I_S is transmitted back to the autonomous mobile device 300 through the transmission line 200 (wired transmission), so the communication between the autonomous mobile device 300 and the unmanned aerial vehicle 100 is less subjected to bandwidth limitation. Therefore, data transmission is more efficient.

In addition, the autonomous mobile device 300 which performs the task of checking supplies power to the unmanned aerial vehicle 100 through the transmission line 200, so the unmanned aerial vehicle 100 does not need to frequently return to the autonomous mobile device 300 to charge, and the checking is more efficient. For example, the autonomous mobile device 300 may continuously supply power to the unmanned aerial vehicle 100 on a time axis through the transmission line 200. Alternatively, the autonomous mobile device 300 may intermittently supply power to the unmanned aerial vehicle 100 on the time axis through the transmission line 200. For example, the autonomous mobile device 300 supplies power to the unmanned aerial vehicle 100 through the transmission line 200 only when the electric quantity of the battery 120 of the unmanned aerial vehicle 100 is below a critical value, and when the electric quantity of the battery 120 of the unmanned aerial vehicle 100 is above another critical value, the autonomous mobile device 300 stops supplying power to the unmanned aerial vehicle 100. The disclosure is not limited to any one power supply method, as long as the power supply method enables the unmanned aerial vehicle 100 to sustain at least one complete checking process performed by the autonomous mobile device 300.

Figure 9:
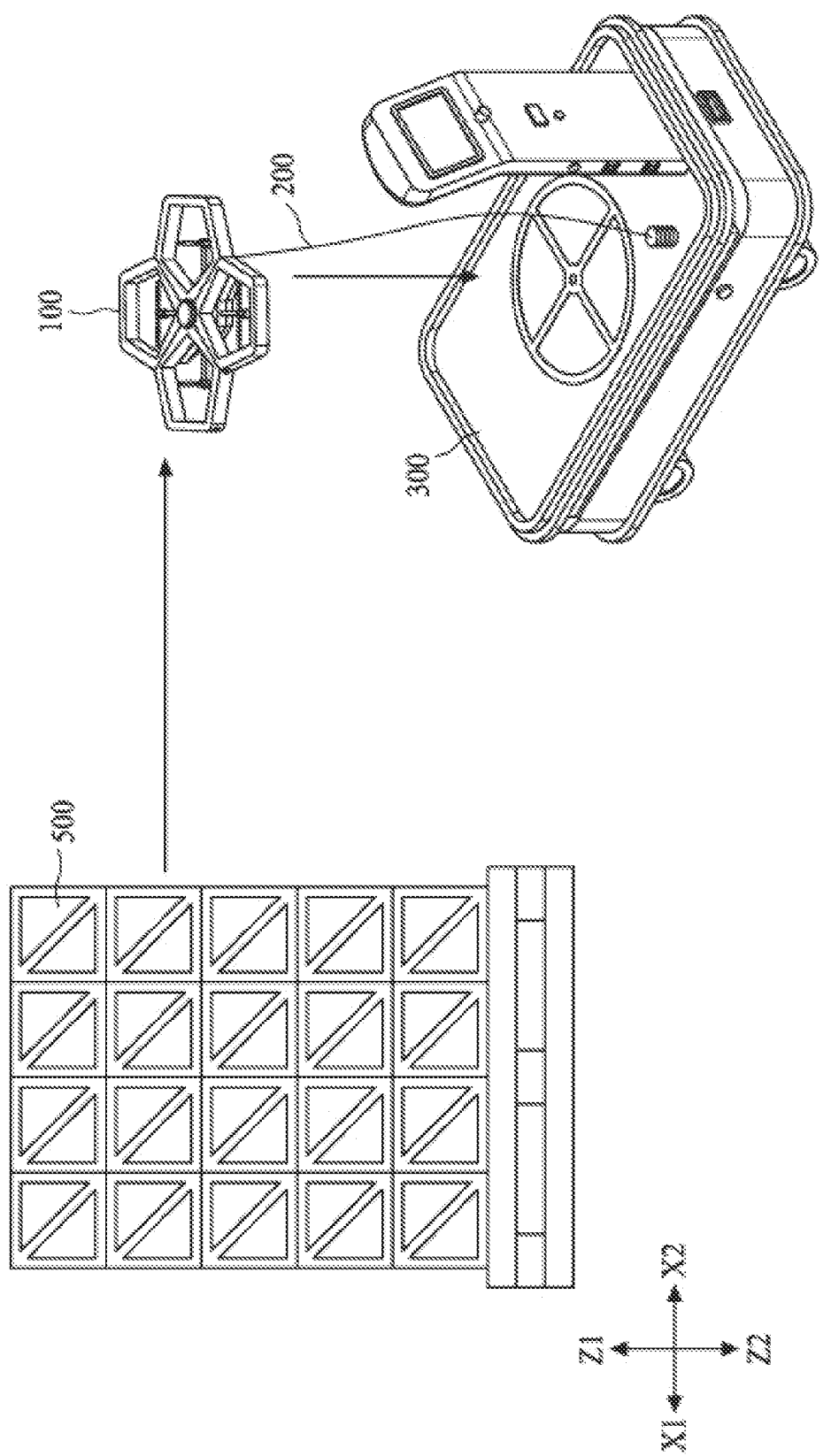
FIG. 9 is a diagram showing that the unmanned aerial vehicle shown in FIG. 1 finishes sensing.

FIG. 9 is a diagram showing that the unmanned aerial vehicle 100 shown in FIG. 1 finishes sensing. Referring to FIG. 9, when the checking is finished (that is, when the task is finished), the autonomous mobile device 300 controls the unmanned aerial vehicle 100 to return to a position above the autonomous mobile device 300, and controls the unmanned aerial vehicle 100 to land on the autonomous mobile device 300 based on the identification mark for landing 324.

Figure 10:
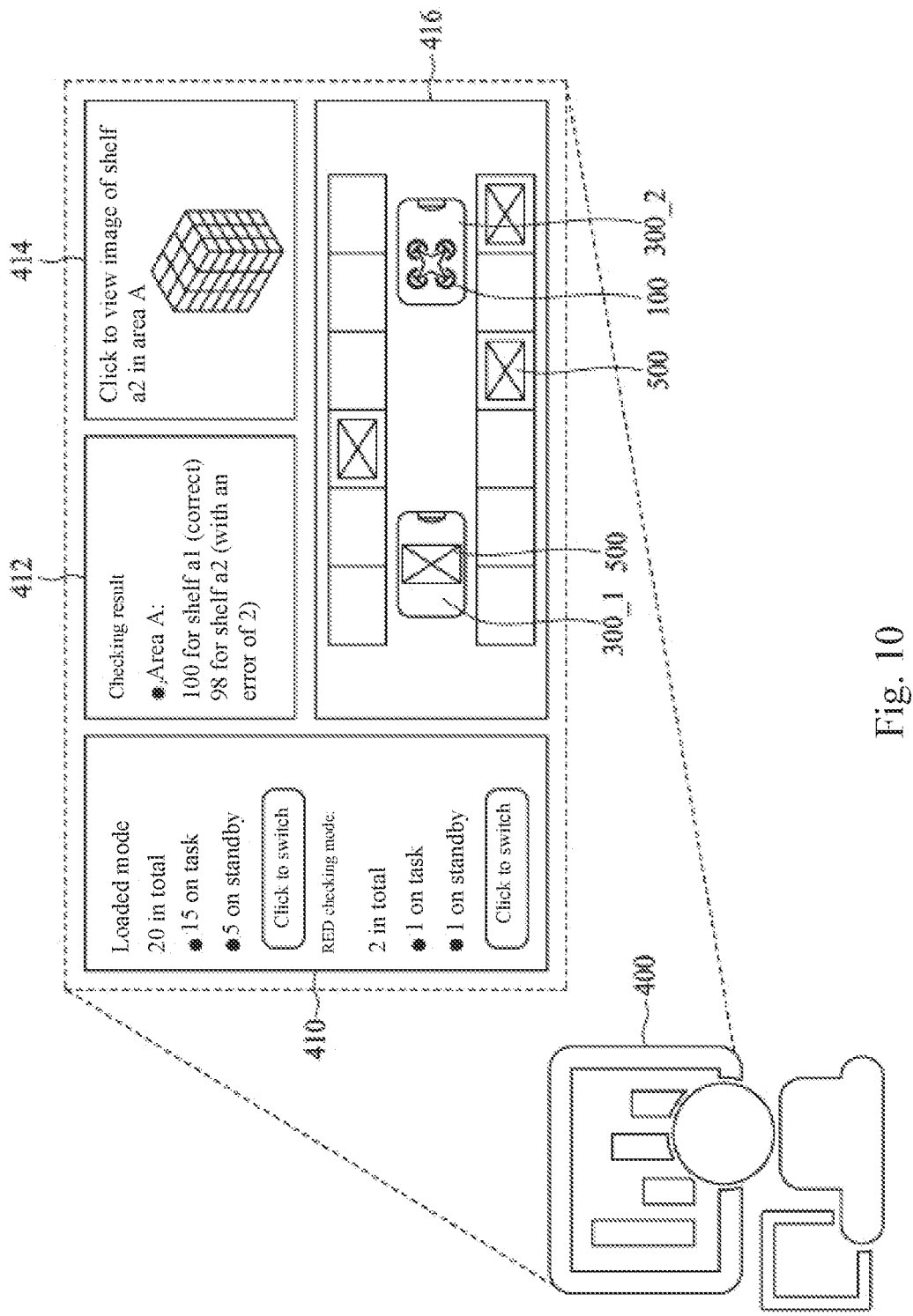
FIG. 10 is a diagram of a remote terminal shown in FIG. 1 displaying information provided by the autonomous mobile device.

FIG. 10 is a diagram of a remote terminal 400 shown in FIG. 1 displaying information provided by the autonomous mobile device 300. Referring to FIG. 10, the remote terminal 400 displays interactive blocks 410, 412, 414 and 416.

The interactive block 410 shows the autonomous mobile devices 300 working in the loaded mode. In this embodiment, there are 20 autonomous mobile devices 300 in the loaded mode, among which 15 autonomous mobile devices 300 are performing tasks and 5 are on standby. In addition, the interactive block 410 also shows the autonomous mobile devices 300 working in the checking mode. In this embodiment, there are two autonomous mobile devices 300 in the checking mode, one of which is performing tasks and the other is on standby. The operator may switch the autonomous mobile device 300 operating in the loaded mode to the checking mode through the interactive block 410, and vice versa. For example, the autonomous mobile device 300 operating in the loaded mode may be switched to the checking mode in response to the user's input of the operator.

The interactive block 412 displays the checking result ST provided by the autonomous mobile device 300. In this embodiment, the interactive block 412 shows that the checking result ST for a shelf a1 in Area A is 100 pieces of goods, which is the same as the predetermined result of 100 pieces of goods. The interactive block 412 also shows that the checking result ST for a shelf a2 in Area A is 98 pieces of goods, which is different from the predetermined result of 100 pieces of goods, with an error of 2. The operation scheme for the situation where the checking result ST is different from the predetermined result is described in detail in the embodiments of FIGS. 13A and 13B.

The interactive block 414 displays images of shelves whose checking results are different from the predetermined result, wherein the presentation of the images is based on the image data IMG. In this embodiment, the interactive block 414 displays the image of the shelf a2 in Area A.

The interactive block 416 displays a real-time working map. In this embodiment, the real-time working map displays positions of the autonomous mobile devices 300_1 and 300_2. In addition, the real-time work map also shows that the autonomous mobile device 300_1 is currently working in the loaded mode, while the autonomous mobile device 300_2 is currently working in the checking mode.

Figure 11:
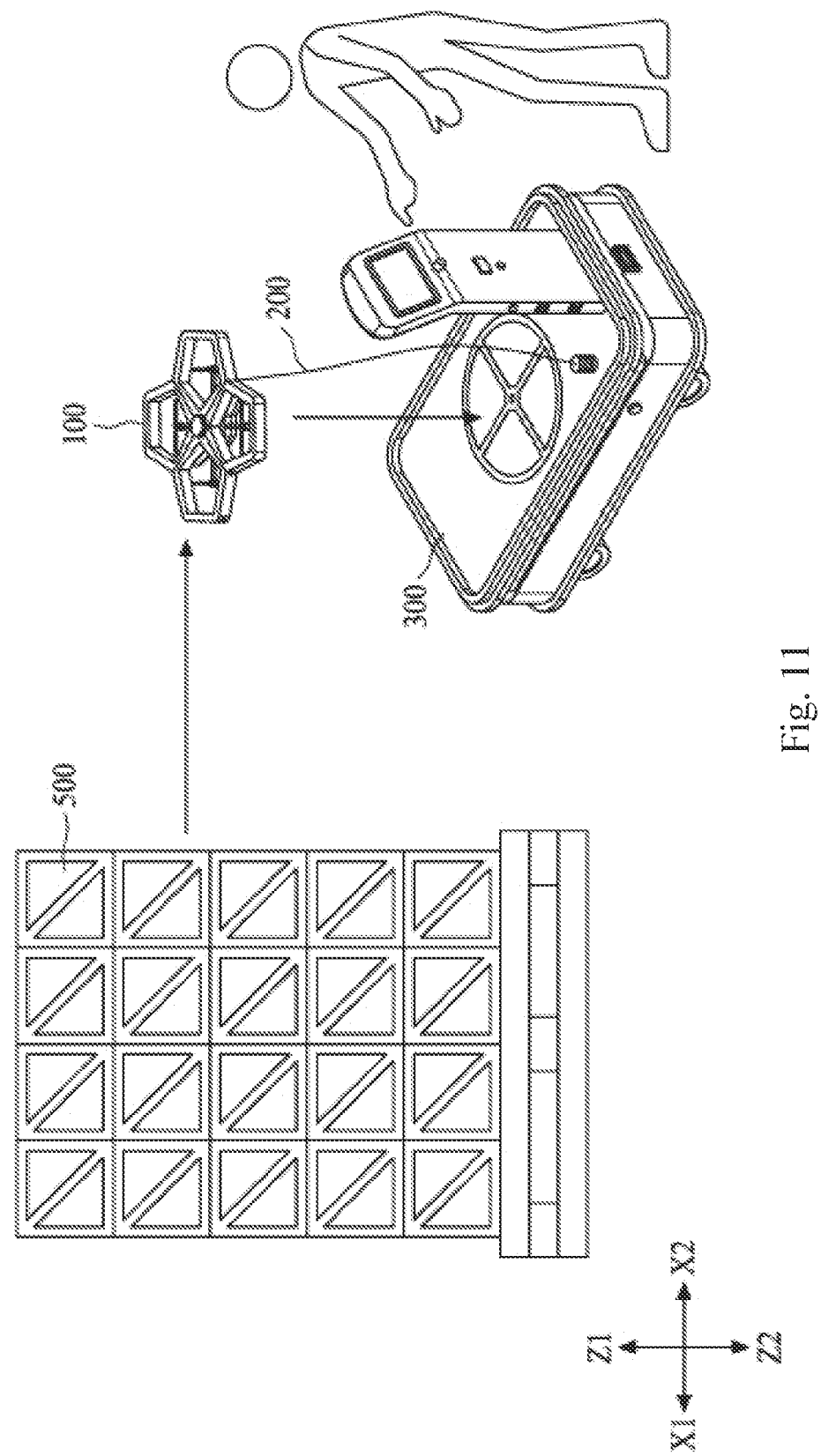
FIG. 11 is a diagram showing that the unmanned aerial vehicle shown in FIG. 1 is forced to finish sensing.

FIG. 11 is a diagram showing that the unmanned aerial vehicle 100 shown in FIG. 1 is forced to finish sensing. Referring to FIG. 10, when the operator needs to use the autonomous mobile device 300 to transport goods 500, for example, the operator may input user's input on the autonomous mobile device 300, so that the autonomous mobile device 300, in response to the user's input, interrupts the checking and recalls the unmanned aerial vehicle 100.

Figure 12:
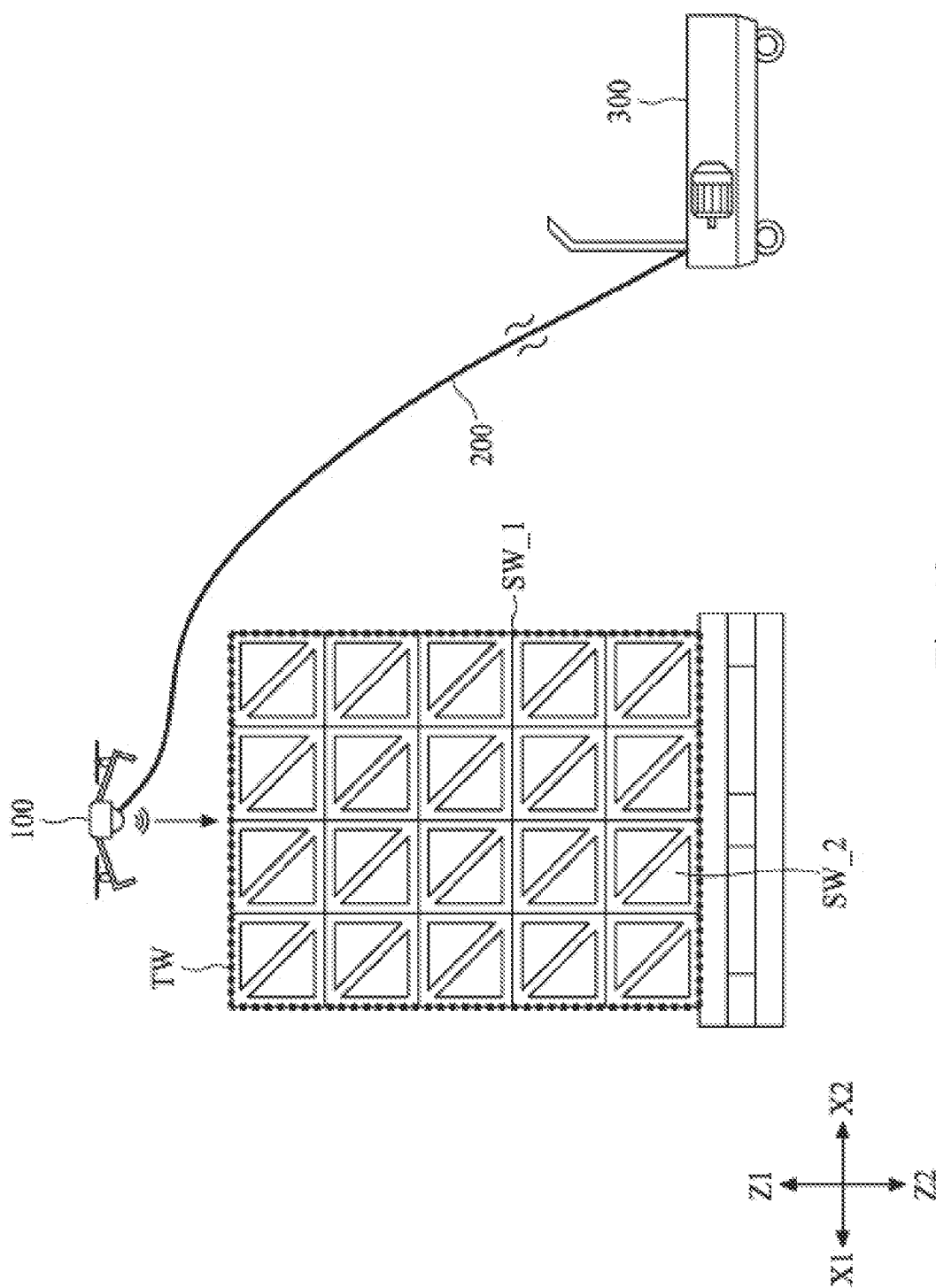
FIG. 12 is a diagram of the unmanned aerial vehicle shown in FIG. 1 sensing stacked goods.

FIG. 12 is a diagram of the unmanned aerial vehicle 100 shown in FIG. 1 sensing the stacked goods 500. Referring to FIG. 12, compared with the embodiment of FIG. 7A, in this embodiment, the unmanned aerial vehicle 100 is located above the top face TW of the stacked goods 500 in the up-down direction Z1-Z2. Accordingly, the sensing module 140 senses the top face TW of the stacked goods 500 in the up-down direction Z1-Z2. Specifically, the distance between the unmanned aerial vehicle 100 and the stacked goods 500 is sensed by the distance sensor 142 to generate the distance data DI. Similarly, the unmanned aerial vehicle 100 will then perform related operations similar to those described in the embodiment of FIG. 7B, which will not be repeated here.

Figure 13B:
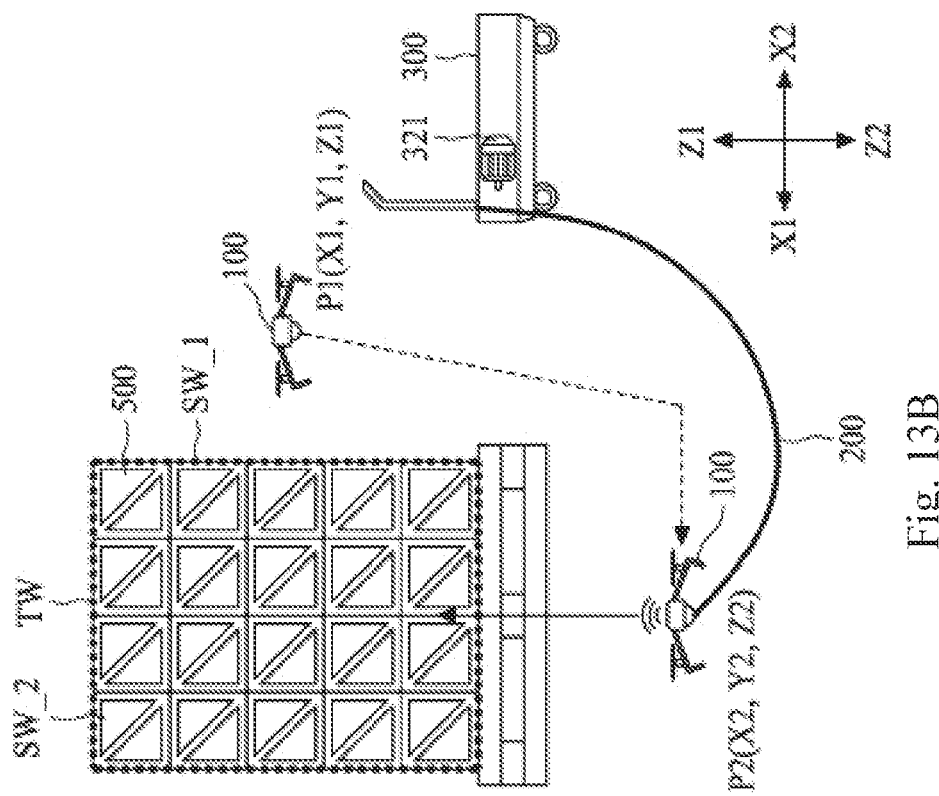
FIG. 13B is a diagram illustrating an operation of the unmanned aerial vehicle shown in FIG. 1 when a checking result is different from a predetermined result.
Figure 13A:
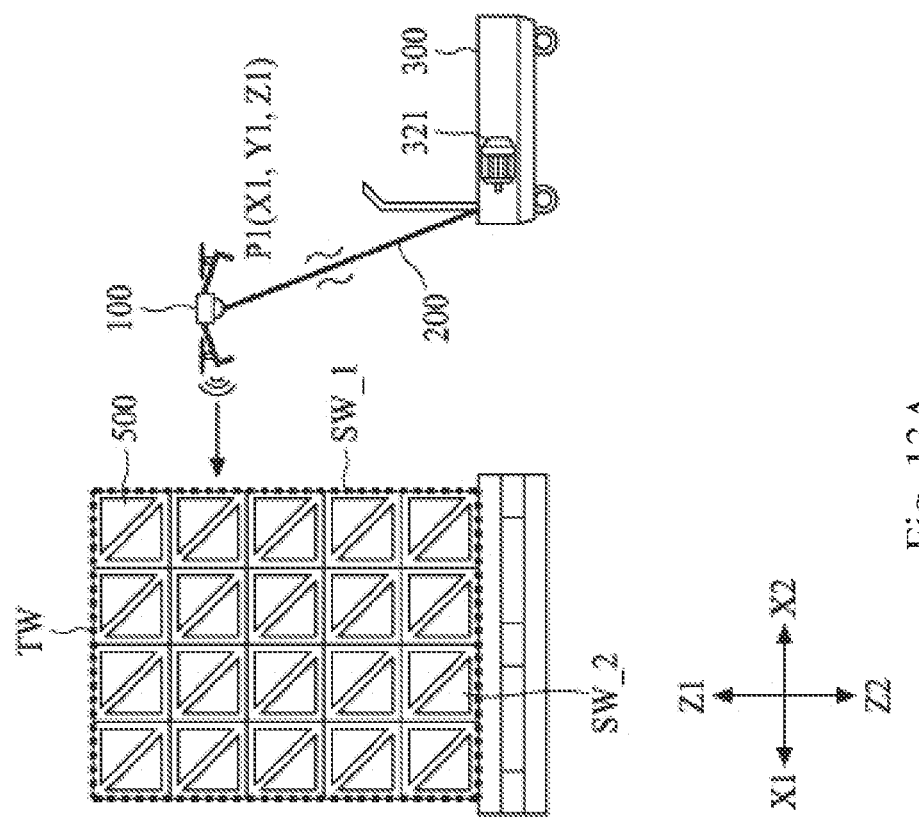
FIG. 13A is a diagram illustrating an operation of the unmanned aerial vehicle shown in FIG. 1 when a checking result is different from a predetermined result.

FIGS. 13A and 13B are diagrams illustrating operations of the unmanned aerial vehicle 100 shown in FIG. 1 when the checking result ST is different from the predetermined result. Referring to FIG. 13A, in first checking work, the autonomous mobile device 300 assigns a first sensing position P1 (X1, Y1, Z1) to the unmanned aerial vehicle 100 through the transmission line 200, thereby controlling the unmanned aerial vehicle 100 to move to the first sensing position P1 (X1, Y1, Z1). In this embodiment, the unmanned aerial vehicle 100 located at the first sensing position P1 (X1, Y1, Z1) faces the side face SW_1 of the stacked goods 500 to sense the side face SW_1 of the stacked goods 500, that is, the operation scheme is similar to that described in the embodiment of FIG. 7A. The unmanned aerial vehicle 100 will then perform related operations similar to those described in the embodiment of FIG. 7B, which will not be repeated here. Then, the unmanned aerial vehicle 100 provides the sensing information I_S related to the side face SW_1 to the autonomous mobile device 300, and the autonomous mobile device 300 determines the checking result ST related to the side face SW_1 accordingly.

When the checking result ST related to the side face SW_1 is not consistent with the predetermined result for the stacked goods 500, the autonomous mobile device 300 may perform second checking automatically or in response to the user's input on the remote terminal 400.

In the second checking work, the autonomous mobile device 300 assigns a second sensing position P2 (X2, Y2, Z2) to the unmanned aerial vehicle 100 through the transmission line 200, for example, in response to user's input, thereby controlling the unmanned aerial vehicle 100 to move to the second sensing position P2 (X2, Y2, Z2). In this embodiment, the unmanned aerial vehicle 100 located at the second sensing position P2 (X2, Y2, Z2) faces the side face SW_2 of the stacked goods 500 to sense the side face SW_2 of the stacked goods 500.

In some embodiments, the unmanned aerial vehicle 100 located at the second sensing position P2 faces the top face TW of the stacked goods 500 to sense the top face TW of the stacked goods 500 in the second checking.

In some embodiments, the second sensing position P2 is the same as the first sensing position P1. That is, the unmanned aerial vehicle 100 senses the same face again.

In some embodiments, at least one of the coordinates (X2, Y2, Z2) of the second sensing position P2 (X2, Y2, Z2) is different from the corresponding one of the coordinates (X1, Y1, Z1) of the first sensing position P1 (X1, Y1, Z1). For example, the coordinate X2 of the second sensing position P2 is different from the coordinate X1 of the first sensing position P1, and the coordinates Y1 and Z1 of the first sensing position P1 are the same as the coordinates Y2 and Z2 of the second sensing position P2.

Figure 14B:
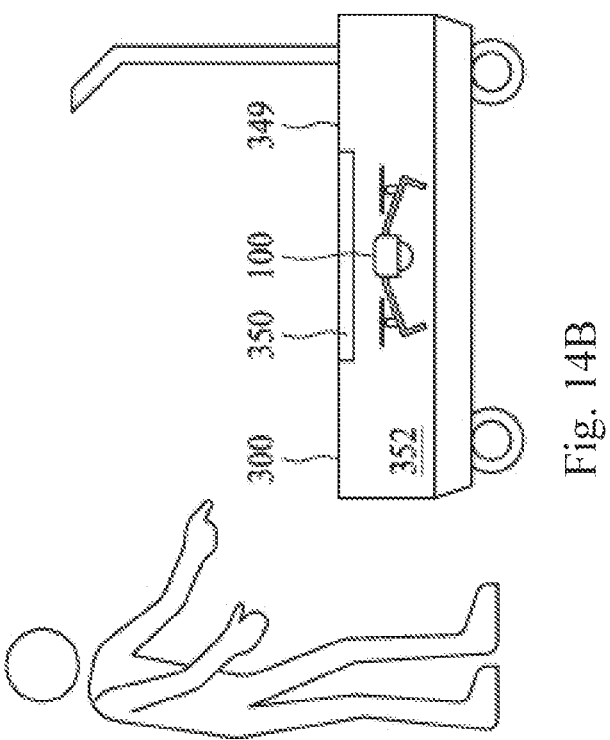
FIG. 14B is a diagram of a first solution for receiving the unmanned aerial vehicle shown in FIG. 1.
Figure 14A:
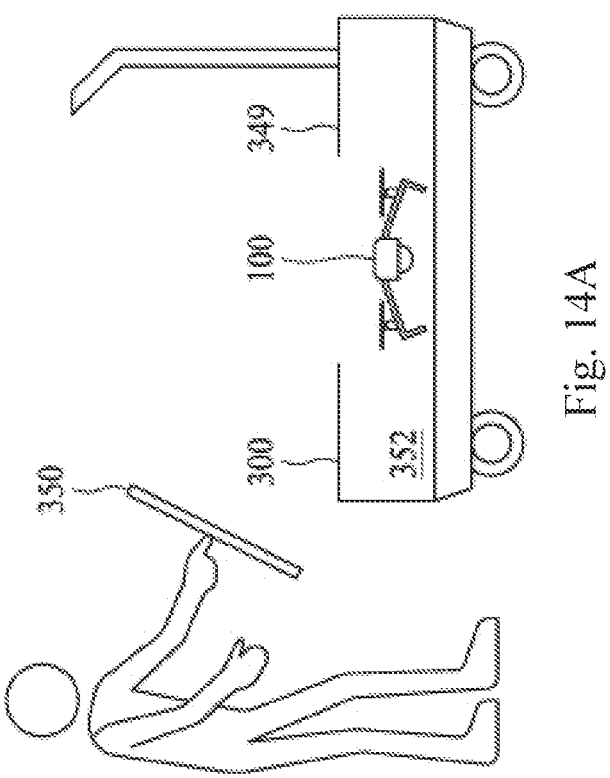
FIG. 14A is a diagram of a first solution for receiving the unmanned aerial vehicle shown in FIG. 1.

FIGS. 14A and 14B are diagrams of a first solution for receiving the unmanned aerial vehicle 100 shown in FIG. 1. Referring to FIGS. 14A and 14B, the vehicle body 302 of the autonomous mobile device 300 comprises a housing 349 and a cover 350. The housing 349 defines a receiving space 352 therein for receiving the unmanned aerial vehicle 100, and the cover 350 is arranged above the receiving space 352 and covers the receiving space 352. In this embodiment, the cover 350 is removed by the operator to expose the receiving space 352. Next, the unmanned aerial vehicle 100 is put into the receiving space 352 by the operator, and then covered with the cover 350. Therefore, the space of the autonomous mobile device 300 may be effectively utilized.

Figure 15B:
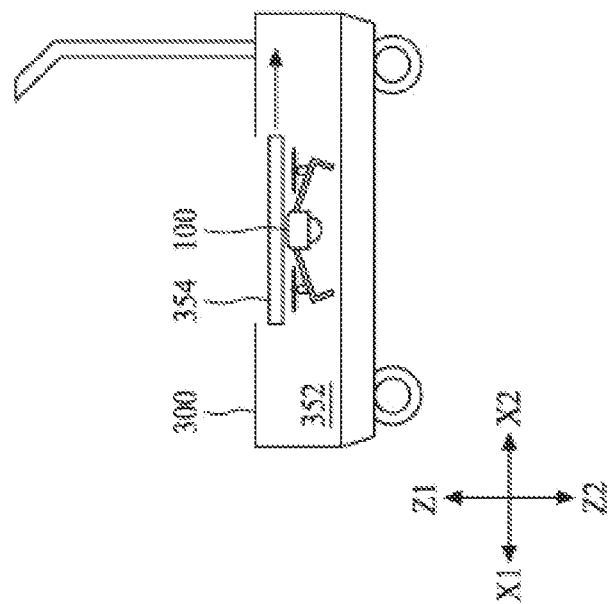
FIG. 15B is a diagram of a second solution for receiving the unmanned aerial vehicle shown in FIG. 1.
Figure 15A:
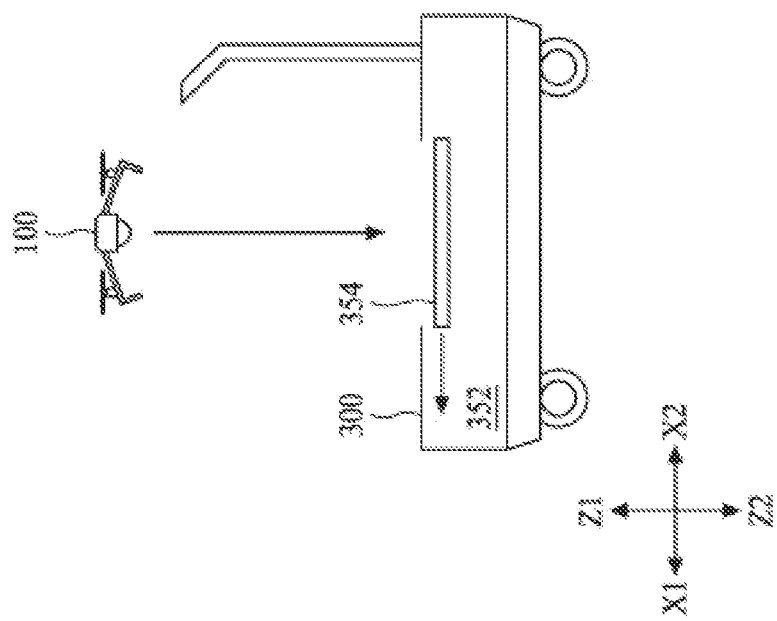
FIG. 15A is a diagram of a second solution for receiving the unmanned aerial vehicle shown in FIG. 1.

FIGS. 15A and 15B are diagrams of a second solution for receiving the unmanned aerial vehicle 100 shown in FIG. 1. Referring to FIGS. 15A and 15B, during the landing of the unmanned aerial vehicle 100, the cover 350 automatically moves in the front-back direction X1-X2 to expose the receiving space 352, so that the unmanned aerial vehicle 100 may directly land in the receiving space 352. After landing in place, the cover 350 automatically covers the receiving space 352 and the unmanned aerial vehicle 100 in the front-back direction X1-X2. In some embodiments, after the cover 350 automatically exposes the receiving space 352, the cable receiving unit 320 is automatically received into the receiving space 352 together with the transmission line 200.

FIG. 16 is a diagram of another system 20 working in the checking mode according to the embodiment of the application. Referring to FIG. 16, the system 20 is similar to the system 10 of FIG. 1, except that the system 20 further comprises a transmission line 250 and an unmanned aerial vehicle 150. That is, the system 20 comprises two unmanned aerial vehicles 100 and 150, which use the transmission lines 200 and 250 respectively.

The functions of the transmission line 250 are similar to those of the transmission line 200 of FIG. 1, and will not be repeated here. The functions and operations of the unmanned aerial vehicle 150 are similar to those of the unmanned aerial vehicle 100 of FIG. 1, and will not be repeated here.

The autonomous mobile device 300 assigns the first sensing position P1 for sensing the side face SW_1 of the stacked goods 500 to the unmanned aerial vehicle 100 through the transmission line 200, so that the unmanned aerial vehicle 100 senses the side face SW_1 of the stacked goods 500 to generate first sensing information. It should be noted that the unmanned aerial vehicle 100 will then perform related operations similar to those described in the embodiment of FIG. 7B, which will not be repeated here.

In addition, the autonomous mobile device 300 supplies power to the unmanned aerial vehicle 150 through the transmission line 200, and assigns the second sensing position P2 for sensing the side face SW_2 of the stacked goods 500 to the unmanned aerial vehicle 150, so that the unmanned aerial vehicle 150 senses the side face SW_2 of the stacked goods 500 to generate second sensing information. It should be noted that the unmanned aerial vehicle 150 will then perform related operations similar to those described in the embodiment of FIG. 7B, which will not be repeated here.

The autonomous mobile device 300 further provides the checking result ST for the stacked goods 500 based on the first sensing information and the second sensing information. Since the amount of sensing information used for determining the checking result ST in one round of checking is larger, the accuracy of the checking result ST provided by the autonomous mobile device 300 is higher, and the checking is more efficient.

Figure 17:
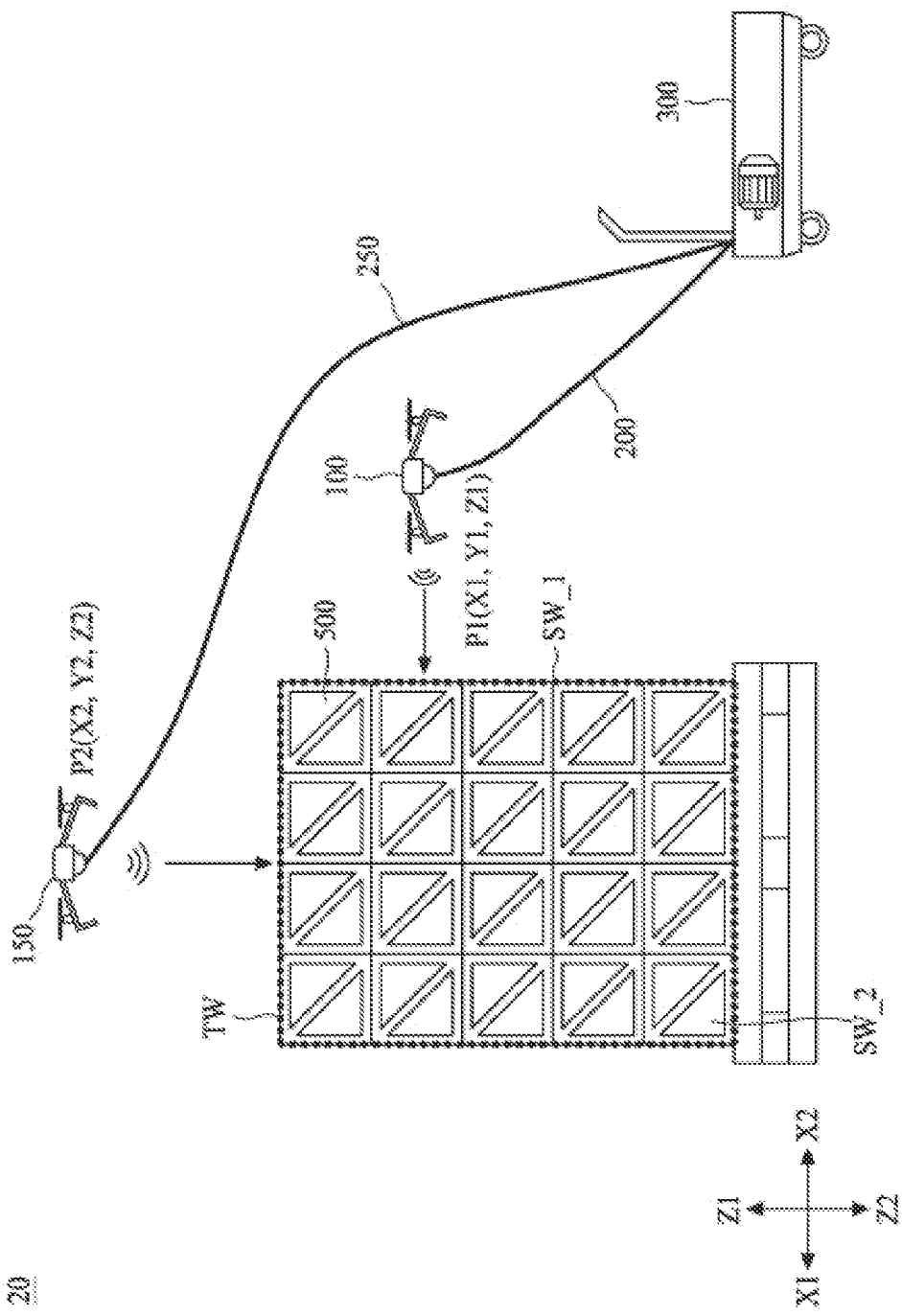
FIG. 17 is a diagram of another operation scheme of the system shown in FIG. 16 in the checking mode.

FIG. 17 is a diagram of another operation scheme of the system 20 shown in FIG. 16 in the checking mode. Referring to FIG. 17, the operation scheme shown in FIG. 17 is similar to that shown in FIG. 16, with the difference that the autonomous mobile device 300 assigns the second sensing position P2 for sensing the top face TW of the stacked goods 500 to the unmanned aerial vehicle 150 through the transmission line 250, so that the unmanned aerial vehicle 150 senses the top face TV of the stacked goods 500 to generate a second sensing information. It should be noted that the unmanned aerial vehicle 150 will then perform related operations similar to those described in the embodiment of FIG. 7B, which will not be repeated here.

Since the amount of sensing information used for determining the checking result ST in one round of checking is larger, the accuracy of the checking result ST provided by the autonomous mobile device 300 is higher, and the checking is more efficient.

What is claimed is:

1. An autonomous mobile robot checking system, comprising:
    a transmission line;
    an unmanned aerial vehicle, sensing stacked goods to generate sensing information; and
    an autonomous mobile device, receiving the sensing information through the transmission line, and supplying power to the unmanned aerial vehicle through the transmission line to enable the unmanned aerial vehicle to sense the stacked goods;
    wherein the autonomous mobile device is configured to provide an inventory for the stacked goods based on the sensing information, the autonomous mobile device comprises:
    a front distance sensor, configured to sense a distance between an obstacle in front of the autonomous mobile device and the autonomous mobile device;
    a lateral sensor, configured to a distance between an obstacle at the side edge of the autonomous mobile device and the autonomous mobile device;
    a laser radar, configured to sense a distance between an obstacle in front of the laser radar and the autonomous mobile device;
    wherein the autonomous mobile device is configured to draw a three-dimensional model of surrounding environment through reflected signals to complete a positioning information of the autonomous mobile device and determine a position of the autonomous mobile device, and the autonomous mobile device is configured to control a destination and a direction of the unmanned aerial vehicle based on the position of the autonomous mobile device.

2. The system according to claim 1, wherein the transmission line mechanically and electrically connects the unmanned aerial vehicle to the autonomous mobile device.

3. The system according to claim 2, wherein the autonomous mobile device automatically enters a checking mode in response to the mechanical and electrical connection, and the unmanned aerial vehicle senses the stacked goods in the checking mode.

4. The system according to claim 2, wherein the autonomous mobile device enters a checking mode in response to user's input, and the unmanned aerial vehicle senses the stacked goods in the checking mode.

5. The system according to claim 1, wherein the autonomous mobile device comprises:
    a cable receiving unit, receiving the transmission line.

6. The system according to claim 5, wherein the cable receiving unit is used for selectively taking up or setting out the transmission line along with movement of the unmanned aerial vehicle relative to the stacked goods.

7. The system according to claim 1, wherein the stacked goods together define a side face and a top face, the unmanned aerial vehicle faces the side face of the stacked goods in a front-back direction, and is separated from the autonomous mobile device in an up-down direction, and the unmanned aerial vehicle comprises:
    a sensing module, sensing the side face of the stacked goods in the front-back direction to obtain the sensing information.

8. The system according to claim 1, wherein the stacked goods together define a side face and a top face, the unmanned aerial vehicle is located above the top face of the stacked goods in an up-down direction, and is separated from the autonomous mobile device in the up-down direction, and the unmanned aerial vehicle comprises:
    a sensing module, sensing the top face of the stacked goods in the up-down direction to obtain the sensing information.

9. The system according to claim 1, wherein the autonomous mobile device comprises:
    a housing, defining a receiving space therein to receive the unmanned aerial vehicle; and
    a cover, being arranged above the receiving space and covering the receiving space.

10. The system according to claim 1, wherein the stacked goods together define a first face and a second face, and after the autonomous mobile device finishes sensing the first face of the stacked goods, the autonomous mobile device, through the transmission line, makes the unmanned aerial vehicle sense the second face of the stacked goods when the inventory is not consistent with a predetermined result for the stacked goods.

11. The system according to claim 10, wherein when the inventory is not consistent with the predetermined result for the stacked goods, the autonomous mobile device makes the unmanned aerial vehicle sense the second face of the stacked goods in response to user's input.

12. The system according to claim 1, wherein the unmanned aerial vehicle is a first unmanned aerial vehicle, the sensing information is first sensing information, the transmission line is a first transmission line, the stacked goods together define a first face and a second face, the first unmanned aerial vehicle is used for sensing the first face of the stacked goods to generate the first sensing information, and the system further comprises:
a second transmission line, and
a second unmanned aerial vehicle, sensing the second face of the stacked goods to generate second sensing information;
wherein the autonomous mobile device receives the second sensing information through the second transmission line, and supplies power to the second unmanned aerial vehicle through the second transmission line to enable the second unmanned aerial vehicle to sense the second face of the stacked goods; and
the autonomous mobile device further provides the inventory for the stacked goods based on the first sensing information and the second sensing information.

13. The system according to claim 12, wherein the first face and the second face of the stacked goods are a first side face and a second side face of the stacked goods, respectively.

14. The system according to claim 12, wherein the first face and the second face of the stacked goods are adjacent to each other.

15. The system according to claim 12, wherein the first face and the second face of the stacked goods are a side face and a top face of the stacked goods, respectively.

16. The system according to claim 12, wherein the autonomous mobile device is further used for assigning a sensing position of the first face of the stacked goods to the first unmanned aerial vehicle through the first transmission line, and assigning a sensing position of the second face of the stacked goods to the second unmanned aerial vehicle through the second transmission line.

17. An autonomous mobile robot checking system, comprising:
a transmission line;
an unmanned aerial vehicle, sensing stacked goods to generate sensing information; and
an autonomous mobile device, controlling the unmanned aerial vehicle to move to a sensing position through the transmission line to sense the stacked goods, receiving the sensing information through the transmission line, providing an inventory for the stacked goods based on the sensing information, the autonomous mobile device comprises:
a front distance sensor, configured to sense a distance between an obstacle in front of the autonomous mobile device and the autonomous mobile device;
a lateral sensor, configured to a distance between an obstacle at the side edge of the autonomous mobile device and the autonomous mobile device;
a laser radar, configured to sense a distance between an obstacle in front of the laser radar and the autonomous mobile device;
wherein the autonomous mobile device is configured to draw a three-dimensional model of surrounding environment through reflected signals to complete a positioning information of the autonomous mobile device and determine a position of the autonomous mobile device, and the autonomous mobile device is configured to control a destination and a direction of the unmanned aerial vehicle based on the position of the autonomous mobile device.

18. The system according to claim 17, wherein the sensing position is a first sensing position, and after the unmanned aerial vehicle finishes sensing the stacked goods at the first sensing position, the autonomous mobile device controls, through the transmission line, the unmanned aerial vehicle to move to a second sensing position to sense the stacked goods when the inventory is not consistent with a predetermined result for the stacked goods.

19. The system according to claim 18, wherein the stacked goods together define a first face and a second face, and the unmanned aerial vehicle faces the first face at the first sensing position and faces the second face at the second sensing position.

20. The system according to claim 19, wherein the first face is a first side face defined by the stacked goods together, and the second face is a second side face defined by the stacked goods together, or
wherein the first face is a side face defined by the stacked goods together, and the second face is a top face defined by the stacked goods together.

* * * * *